(12) United States Patent
Wascat et al.

(10) Patent No.: US 9,913,006 B1
(45) Date of Patent: Mar. 6, 2018

(54) POWER-EFFICIENT DATA-LOAD-EFFICIENT METHOD OF WIRELESSLY MONITORING ROTATING MACHINES

(71) Applicant: 01dB-Metravib, Societe par Actions Simplifiee, Limonest (FR)

(72) Inventors: Bertrand Wascat, Limas (FR); Thierry Mazoyer, Auzelles (FR); Patrick Labeyrie, Dardilly (FR); Guillaume Lavaure, Limas (FR); Philippe Poizat, Marcilly D'azergues (FR)

(73) Assignee: 01dB-METRAVIB, Société par Actions Simplifiée (FR)

( * ) Notice: Subject to any disclaimer, the term of this patent is extended or adjusted under 35 U.S.C. 154(b) by 0 days.

(21) Appl. No.: 15/361,883

(22) Filed: Nov. 28, 2016

(51) Int. Cl.
| | |
|---|---|
| *H04Q 9/00* | (2006.01) |
| *G01M 99/00* | (2011.01) |
| *H04W 4/00* | (2009.01) |
| *H04W 88/16* | (2009.01) |

(52) U.S. Cl.
CPC ............ *H04Q 9/00* (2013.01); *G01M 99/005* (2013.01); *H04W 4/005* (2013.01); *H04W 4/008* (2013.01); *H04Q 2209/00* (2013.01); *H04Q 2209/10* (2013.01); *H04Q 2209/40* (2013.01); *H04Q 2209/84* (2013.01); *H04W 88/16* (2013.01)

(58) Field of Classification Search
CPC .......... G01H 1/00; G01H 1/003; G01H 1/006; G01M 13/00; G01M 13/028; G01M 99/005; H04W 4/005; H04W 4/008; H04W 88/16; H04Q 9/00; H04Q 2209/00; H04Q 2209/10; H04Q 2209/40; H04Q 2209/84
See application file for complete search history.

(56) References Cited

U.S. PATENT DOCUMENTS

| | | | |
|---|---|---|---|
| 4,758,380 A | 9/1988 | Vermeiren et al. | |
| 5,566,092 A * | 10/1996 | Wang ................ | G05B 19/4184 700/159 |
| 5,633,811 A | 5/1997 | Canada et al. | |
| 5,679,900 A | 10/1997 | Smulders | |
| 5,845,230 A | 12/1998 | Lamberson | |
| 5,852,351 A | 12/1998 | Canada et al. | |
| 5,854,553 A | 12/1998 | Barclay et al. | |
| 5,854,994 A | 12/1998 | Canada et al. | |
| 5,875,420 A | 2/1999 | Piety et al. | |

(Continued)

*Primary Examiner* — Hai Phan
*Assistant Examiner* — Franklin Balseca
(74) *Attorney, Agent, or Firm* — Jordan and Koda, PLLC

(57) ABSTRACT

Data acquisition and automatic diagnosis is performed at test points by respective wireless monitoring units (WMU). Each WMU tests a first indicator periodically at a first rate to determine whether to test a full set of indicators. Evolution of the first indicator determines the pass/fail result of a reduced assessment of the corresponding test point. The pass/fail result is automatically sent off-site to a central database. When a fail occurs, a full assessment is performed, which includes monitoring the full set of indicators. Automatic diagnosis is performed based on the full set of indicators. The reduced assessment does not include automatic diagnosis of a test point, but is used to decide whether to perform the full assessment and automatic diagnosis. Results of the automatic diagnosis are sent to the central database. Raw data is not sent automatically.

20 Claims, 11 Drawing Sheets

(56) References Cited

U.S. PATENT DOCUMENTS

| | | |
|---|---|---|
| 5,907,491 A | 5/1999 | Canada et al. |
| 5,922,963 A | 7/1999 | Piety et al. |
| 5,943,634 A | 8/1999 | Piety et al. |
| 5,992,237 A | 11/1999 | McCarty et al. |
| 5,870,699 A | 12/1999 | Canada et al. |
| 6,006,164 A | 12/1999 | McCarty et al. |
| 6,076,874 A | 6/2000 | Piety et al. |
| 6,124,692 A | 9/2000 | Canada et al. |
| 6,138,078 A | 10/2000 | Canada et al. |
| 6,192,325 B1 | 2/2001 | Piety et al. |
| 6,199,422 B1 | 3/2001 | Boerhout et al. |
| 6,202,491 B1 | 3/2001 | McCarthy et al. |
| 6,275,781 B1 | 8/2001 | Maness et al. |
| 6,301,514 B1 | 10/2001 | Canada et al. |
| 6,351,713 B1 * | 2/2002 | Board .................. G01M 13/028 702/181 |
| 6,437,692 B1 | 8/2002 | Petite et al. |
| 6,489,884 B1 | 12/2002 | Lamberson et al. |
| 6,513,386 B2 | 2/2003 | Barclay |
| 6,633,822 B2 | 10/2003 | Maness et al. |
| 6,789,025 B2 | 9/2004 | Boerhout |
| 6,792,360 B2 | 9/2004 | Smulders et al. |
| 7,103,511 B2 | 9/2006 | Petite |
| 7,142,990 B2 | 11/2006 | Bouse et al. |
| 7,313,484 B2 | 12/2007 | Lindberg et al. |
| 7,324,919 B2 | 1/2008 | Lindberg et al. |
| 7,456,269 B2 | 12/2008 | Loesl et al. |
| 7,697,492 B2 | 4/2010 | Petite |
| 7,711,519 B2 | 5/2010 | Lindberg et al. |
| 7,805,281 B2 | 9/2010 | Leigh |
| 8,174,402 B2 | 5/2012 | Bouse et al. |
| 8,370,109 B2 | 2/2013 | Van Dyke et al. |
| 2014/0121996 A1 | 5/2014 | Piety et al. |
| 2016/0041070 A1 * | 2/2016 | Wascat ................... G01M 7/00 702/183 |

\* cited by examiner

POWER-EFFICIENT DATA-LOAD-EFFICIENT METHOD OF WIRELESSLY MONITORING ROTATING MACHINES

RELATED SPECIFICATION

This application is related to commonly-assigned, U.S. patent application Ser. No. 15/361,980 of Wascat et al. filed on the same day for "Power Efficient Machine Diagnostic Monitoring Using Multiple Vibration Sensor Configuration," and is incorporated herein in its entirety by reference. The specification of commonly-assigned, U.S. patent application Ser. No. 14/451,777 of Wascat et al. filed on Aug. 4, 2014 for "Automatic Rotating-Machine Fault Diagnosis With Confidence Level Indication" is incorporated herein in its entirety by reference.

BACKGROUND OF THE INVENTION

This invention relates generally to the collection and analysis of machine diagnostic data, such as vibration data, temperature, and rotation speed. More particularly, this invention relates to a wireless sensor network and a method for monitoring a plurality of machines.

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. Accordingly, it is desirable to implement an effective predictive maintenance program to keep the machines in good working condition. Examples of such machines for which it is desirable to collect data for preventive maintenance are motors, pumps, generators, compressors, lathes and other machines having rotating or other moving parts, such as a shaft, rotor, or bearings.

Most predictive maintenance programs include the periodic collection of machine data, such as vibration data, rotation speed, and temperature. Vibration data is sensed using an accelerometer. Rotation is sensed by a tachometer. Temperature is sensed with a temperature sensor. Data collection previously has involved an operator carrying a data collection unit, sensors, and cables from machine to machine. A sensor is mounted at a test point on a given machine, then coupled to the data collection unit by a cable. The operator then operates the data collection unit to gather the data. The operator performs a route of a facility to gather data from one or more test points of one or more machines. Typically, the data then is uploaded from the data collection unit to a data analysis system where condition monitoring is performed, so as to provide early fault detection and efficiently schedule maintenance of a machine.

Wireless sensors have reduced the need for an operator to carry cables along a data collection route. The sensors instead communicate wirelessly with the data collection unit under the control of the operator walking the route. In some instances wireless sensors have been permanently installed at machine test points. These advances have allowed data acquisition to become more efficient.

More efficient data acquisition also has led to more data acquisition. However, the analysis of acquired data to diagnose a machine often requires special expertise. Thus, more data has led to the need for more special expertise. As an industrial trend, however, there are fewer technicians able to analyze machine diagnostic data for predicting faults and for identifying a need to perform machine maintenance so as to avoid unexpected failures of rotating machines.

Accordingly, the acquisition of more data has led to the need for more efficient and effective analysis of machine diagnostic data. The shortage of experts with the required expertise has led to the need for allocating the time of technicians having such expertise more efficiently. These and other needs are addressed by various embodiments of the present invention.

SUMMARY OF THE INVENTION

According to the invention, an automated system of monitoring diagnostic performance of a plurality of machines includes performing data acquisition and condition monitoring at each test point of each machine with a respective wireless monitoring unit installed at the test point. Each wireless monitoring unit tests one or more indicators periodically at a first rate to determine whether to test a full set of indicators. Testing the one or more indicators is a reduced assessment of the corresponding test point. A simple pass/fail result of each reduced assessment is automatically sent off-site to a central database. Testing of the full set of indicators is a full assessment of the corresponding test point. Automatic diagnosis is performed by the respective wireless monitoring unit as part of the full assessment. Of significance is that the reduced assessment does not provide an automatic diagnosis of the test point, but is useful to decide whether to obtain measures of the full set of indicators for an automatic diagnosis.

According to an aspect of the invention, at a given wireless monitoring unit, the automatic diagnosis is at the test point level of analysis (as distinct from being at the machine level of analysis where measures and analysis from multiple test points, as needed, are used to derive the automatic diagnosis). The results of the automatic diagnosis are sent automatically off-site to the central database. An off-site processing system, including the central database, consolidates the results of the automatic diagnosis of each test point, in effect taking the analysis to the machine level. Accordingly, the automatic diagnosis at the machine level is formed off-site.

According to another embodiment of the invention, the consolidation instead is performed at one of the wireless monitoring units mounted on the machine. Each wireless monitoring unit on the machine performs a respective full test point assessment to derive an automatic diagnosis at the test point level of analysis. One of the wireless monitoring units (referred to herein as a primary unit) is configured with an additional process for consolidating results from the other wireless monitoring units of the same machine. Accordingly, the other wireless monitoring units (referred to herein as secondary units) send their automatic diagnosis results to the primary unit. The primary unit then consolidates the results so as to take the analysis to the machine level. In this embodiment, only the machine level automatic diagnosis results derived by the primary unit are sent off-site as part of the full assessment. The full assessment for the secondary units differs in this embodiment, so as to send the automatic diagnosis results (at the test point level of analysis) to the primary unit, rather than off-site.

Of particular significance is that only the pass/fail results and automatic diagnosis results are being transmitted from a wireless monitoring unit as part of the power-efficient data-load-efficient method of wirelessly monitoring rotating machines. Raw data is only transmitted in response to a specific command for such raw data. Accordingly, the data load on the wireless network is reduced while still effectively monitoring the diagnostic performance of each machine. Such a methodology is effective because the indicator(s) monitored in the reduced assessment are generally predictive for other indicators among the full set of indicators.

In preferred embodiments the raw data acquired for the most recent full assessment is saved locally in storage on the wireless monitoring unit that acquired the data. Of significance is that the raw data from the prior full assessment is deleted from storage when the most recent full assessment is performed. In some embodiments a moving window of raw data sets is retained, such as for the three most recent full assessments. The specific number of data sets in the moving window will vary according to the embodiment. In some embodiments the raw data includes both the data samples as acquired by a sensor and the measures derived from the acquired data samples. The measures are used to formulate the automatic diagnosis.

A near field communication interface is included in the wireless monitoring unit, so that local access can be provided. A user can operate a near-field-communication (NFC) enabled device linked to a wireless monitoring unit to access the storage of the wireless monitoring unit. Accordingly, the contents of the moving window of stored data is accessible to such a user. In some embodiments, commands may be issued to the wireless monitoring unit by the user through the near field communication interface. Example commands include a request that a full assessment be performed immediately, at some specific time, to activate or cancel periodic activation of the full assessment (as distinct from the contingent activation performed when the reduced assessment fails.) Configuration commands, such as to program the periodicity for the periodic activation of the full assessment, or for the periodic activation of the reduced assessment, also may be issued. The periodicity value is selected so as to optimize diagnostic monitoring effectiveness and power consumption reduction.

An effect of the inventive method is to reduce the need for frequent periodic activation of the full assessment processes. In a preferred embodiment the periodic activation is reduced to once per day. The specific periodicity may vary from once per day, and is selected by a user according to the type of machine and the machine's recent diagnostic health. This reduction provides a substantial and advantageous reduction in the amount of power consumed to effectively monitor the host machine. This is a significant benefit because when battery life gets too short, the cost effectiveness of automated monitoring methods is reduced. Although there still may be cost savings relative to earlier systems of walking a route every month (or other time interval) to perform data collection with a data collection device, such savings are diminished the more often a technician has to visit a facility and a machine to change a battery.

The significance of the reduced assessment and contingent activation of the full assessment reducing the data load communicated off-site is appreciated when considering the data reduction. The volume of raw data for a full assessment typically includes data for multiple fast fourier transforms (FFTs) (e.g., three FFT per axis of measurement, corresponding to the low frequency FFT, medium frequency FFT, and high frequency FFT; correspondingly, 9 FFTs for a triaxial sensor) and data for a time waveform. Data for a single time waveform includes up to 16K samples that can require up to 20 minutes to be transferred using industrial wireless protocols. Multiple this times the number of test points (across multiple machines) served by a wireless network, times the number of performances per day of a full assessment for each test point yields a burdensome data load. Add in the bandwidth needed for other types of data from other types of sensors for each test point of each machine each day and the bandwidth needed for other purposes and the wireless network becomes compromised. The efficiencies gained by wireless monitoring are lessened.

An aspect of monitoring vibration-related indications includes monitoring the trend and the evolution of the machine behavior. It is assumed that if machine behavior is stable, there will be no evolution of the diagnosis of the machine. Accordingly, a reliable indicator of evolution is selected as the indicator to be monitored by the reduced assessment. In a preferred embodiment, the overall velocity is a single and only indicator that is monitored for the reduced assessment. Measurement and monitoring of the overall velocity indicator preferably is performed according to the ISO10816 standard guideline. When there is a change in the alarm status according to the ISO10816 guideline (based on the machine classification) of the overall velocity between two measurements; OR when there is an evolution of the overall velocity of more than e.g. 10% (the percentage may vary), then a full assessment is performed.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
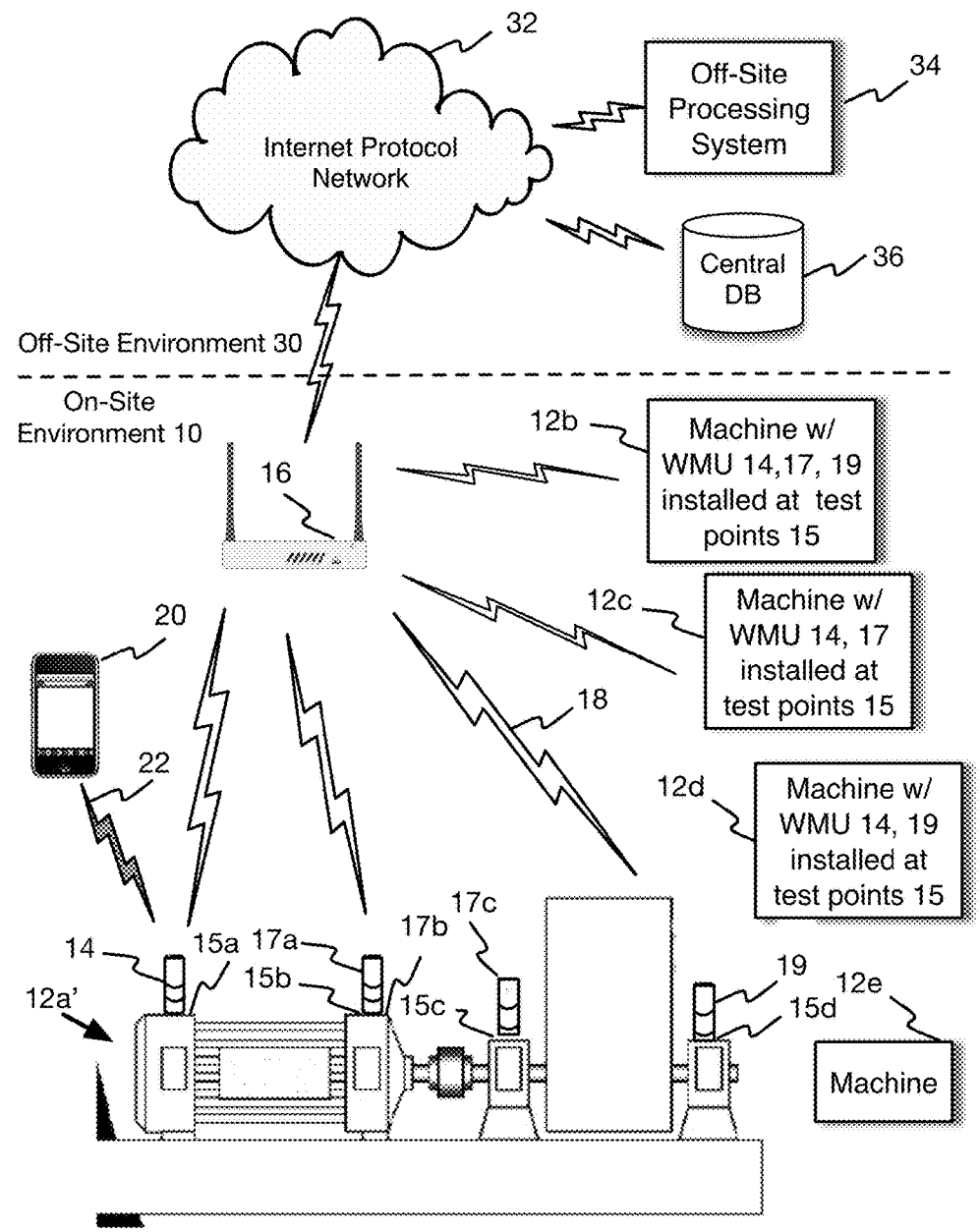
FIG. 1 is a diagram of an exemplary environment for a machine diagnostic network environment that utilizes a wireless monitoring unit (WMU) according to an embodiment of this invention.

In the following description, for purposes of explanation and not limitation, specific details may be set forth, such as particular terminals, devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention. Accordingly, computer components and other components, protocols, and interfaces, known to one of ordinary skill in the art of machine vibration data collection and analysis are intended to be inferred into the detailed description. The terms fault and defect are used interchangeably herein, and are not intended to have a different meaning.

Overview

Acquisition of diagnostic data using wireless sensors mounted on a machine provides many benefits.

Personnel safety is improved when wireless data acquisition in a hazardous area is achieved because a technician no longer needs to be nearby to facilitate data collection, New monitoring capabilities are achieved for testing that were not be achievable for monitoring with a wired sensor unit. For example a wireless monitoring unit (WMU) of this invention can be located at test points that are inaccessible to a wired sensor unit. The WMU can be installed even on a machine that is mobile during monitoring.

Data acquisition is more cost effective in facilities where distances or facility environments made cabling costs prohibitive.

The monitoring solution is expandable. A facility can start a wireless monitoring program on a limited number of machines or test points, and easily expand monitoring to include other machines and test points by installing other WMUs.

Of particular significance is that a wireless monitoring unit, according to embodiments of this invention, makes condition monitoring accessible to a wider type of machine. In addition, data can be acquired more often, as desired, because a technician need not be walking a route to collect the data.

The increased number of machines that can be monitored, the increased number of test points that can be monitored on a given machine, and the increased frequency of collecting data accentuate the existing problem of the shortage of technicians having special expertise in analyzing diagnostic data. One solution is to bring the data to the expert, rather than bring the expert to the machine or facility. Accordingly, transmitting diagnostic data offsite to where the expert is located is desirable. This allows more machines and more sites to be served by a technician having the special expertise. However, such solution introduces new problems.

Diagnostic monitoring includes monitoring vibration data using vibration sensors, and temperature data using temperature sensors. For some machines there also may be monitoring of speed, power, oil quality, displacement, pressure, sound, and other data using other sensors. Thus, there are multiple sensors transmitting data over a wireless network. For a single round of data acquisition for condition monitoring and diagnosis, the vibration data alone for a vibration measure includes a time waveform composed of 16K samples. To transmit such samples from the sensor may require up to 20 minutes using known industrial wireless protocols. The total data burden on the wireless network will include that 20 minutes multiplied by the number of test points per machine, times the number of machines, times number of rounds of acquisition. The data transmission requirements for the other sensors further adds to the total data burden on the wireless network, along with the traffic needed for other uses of the wireless network, (e.g., machine operations; process information such as pressure and flow.) Accordingly, the wireless network bandwidth is a significant bottleneck that limits the effectiveness of condition monitoring.

One solution provided by embodiments of the invention is to use the wireless network more efficiently. One solution provided according to embodiments of the invention is to acquire vibration measurements of diagnostic indicators only when the machine is found to be running. Another solution is to process the raw data from a test point locally in the wireless monitoring unit that acquired the data.

Still another solution is to be more effective at acquiring data when there is a greater likelihood of there being a fault condition relative to other times when there is less likelihood. Effective monitoring includes monitoring the trend and the evolution of the machine's behavior. If machine behavior is stable, there is less likely to be an evolution of the diagnosis from prior diagnoses. According to a preferred embodiment, a measure of the overall vibration velocity is acquired/derived at a test point and monitored according to the ISO10816 standard guideline. Other vibration measures need not be acquired and derived as frequently—unless a need for such measures is determined. For example, if there is a change in the alarm status between two measurements; or if there is an evolution of the vibration velocity by more than a select percentage (e.g. 10% or as otherwise configured by an operator), then a full set of vibration measurements is acquired/derived. Accordingly, a reduced set of vibration measures is monitored at one periodicity, (e.g., once per hour) and a full set of vibration measures is monitored less often at a different periodicity, (e.g., once per day.) Preferably it is only when the monitoring of the reduced set identifies a significant change, that monitoring of the full set of measures will be performed more often than the selected slower periodicity. Of course, an operator also can request a full set of vibration measures at anytime by sending a command for such data acquisition and analysis. Further, once a problem has been identified, an operator may reprogram the periodicity at which the full set of vibration measures is acquired, if needed, so as to acquire the full set more frequently. Such change will vary in accordance with the risks and severity associated with an identified, fault, alarm or other problematic condition diagnosed.

These solutions result in a more efficient and effective approach to data acquisition, condition monitoring and machine diagnosis. Data traffic on the wireless network is reduced. Power consumption by the WMU is reduced. As a result, the WMU battery life is extended. The specific, respective, time intervals for the reduced assessment and the full assessment are selected to optimize monitoring effectiveness and to more efficiently use the limited power available from the battery.

Machine Diagnostic Data Acquisition Environment

FIG. 1 shows a machine diagnostic data acquisition environment according to an embodiment of this invention. The environment includes an on-site data acquisition network environment 10 and an off-site network environment 30. On-site are one or more machines 12. Typically, there are multiple machines in an industrial facility. The specific number of machines may vary. Depicted is an on-site environment having five machines 12a-12e. Multiple wireless monitoring units are included for monitoring vibration, and in some embodiments other diagnostic measures, of the machines 12a-12e. Three configurations of wireless monitoring unit (WMU) 14, 17, 19 are included, as described below under a separate heading.

Each machine hosting a WMU 14, 17, 19 has part(s) that move or are moved against, such as a shaft, rotor, bearings, and gears. For example, machines 12a-12e may include a motor, a pump, a generator, a compressor, and/or a lathe. To keep the machines in good working condition and monitor for decreased performance or reliability over time, condition monitoring and automatic diagnosis is performed. In particular, fault detection, alarm conditions, or other defect or impending-defect conditions are identified so as to schedule a maintenance operation. The benefits are immediate as the predictive maintenance scheduling avoids production losses and reduces maintenance costs (e.g., spare part management is more efficient; maintenance can focus on the defective component only; collateral damage to other components of the machine can be avoided).

The machine diagnostic data acquisition on-site network environment 10 provides a solution for monitoring machine assets of a company. In particular data may be collected on-site and transmitted off-site for analysis by an off-site processing system 34. Alternatively, the data may be evaluated on-site by an on-site processing system (not shown). In a preferred embodiment, monitoring and automatic diagnosis are performed by the WMU 14,17a, 17b, 19 mounted at respective test point 15a-d on the host machine 12a. For some monitored conditions, the condition may be of a type that a complete automatic diagnosis may be achieved based solely on the diagnostic data obtained from a given WMU 14 at a given test point 15a of the host machine 12. For other monitored conditions, diagnosis performed by an individual WMU 14 may be incomplete. This is because for such other conditions, data from other test points 15b, 15c, 15d is required to make an accurate diagnosis of the health of the host machine 12a. According to an embodiment of the invention, the multiple WMUs 14,17, 19 communicate with each other to consolidate analysis of the respective test points 15a-15d to achieve condition monitoring and automatic diagnosis for the machine 12a as a whole, (i.e., at the machine level of analysis.) In an example embodiment, one WMU 14 is configured to receive analysis results from the other WMUs 17a-17b, 19 to perform consolidated condition monitoring and consolidated automatic diagnosis at the machine level of analysis.

Wireless Monitoring Unit Embodiments

According to the invention, a wireless monitoring unit (WMU) is installed on a machine 12. For example, a given machine 12a may have multiple wireless monitoring units 14, 17a, 17b, 19. Each one of multiple machines 12a-12d may have one or more wireless monitoring units 14,17, 19 installed. In some environments there may be machines 12a-d having one or more WMU's 14 installed, and other machines 12e that do not have a WMU 14 installed. In some environments there may be machines 12a-c having one or more WMU's 17 installed, and other machines 12d,e that do not have a WMU 17 installed. In some environments there may be machines 12a,b,d having one or more WMU's 19 installed, and other machines 12c,e that do not have a WMU 19 installed. In some environments there may be machines 12e that have no wireless monitoring units 14, 17, 19 installed.

Figure 2:
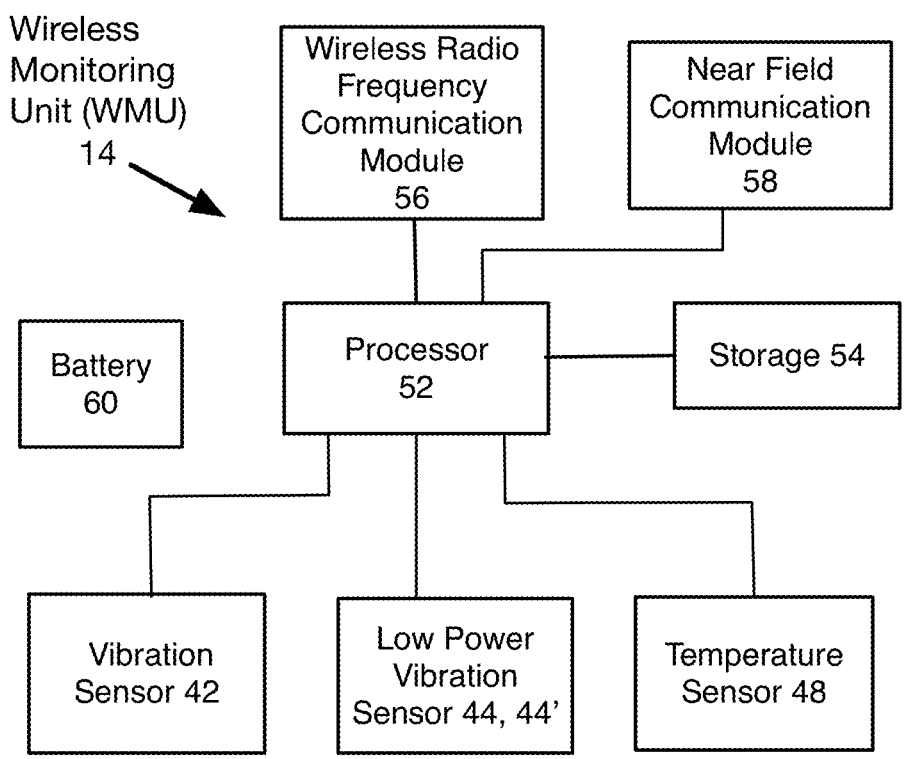
FIG. 2 is a block diagram of a vibration sensing WMU according to an embodiment of this invention.
Figure 3:
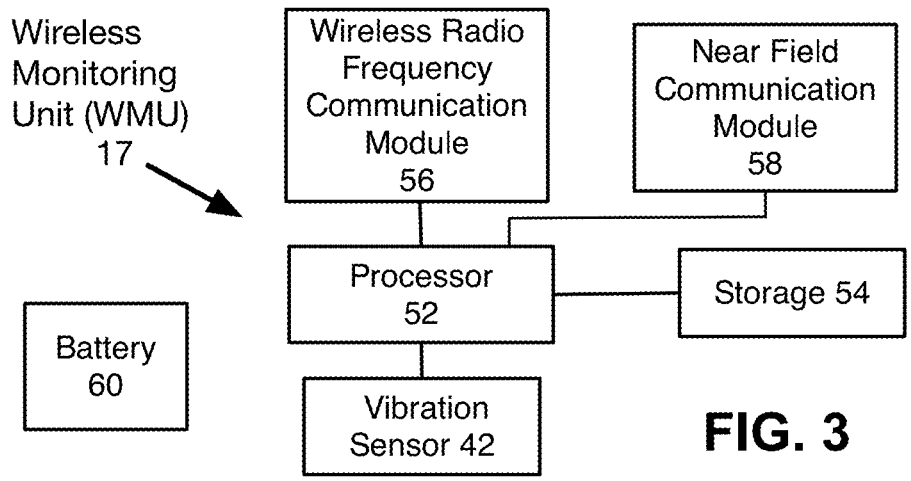
FIG. 3 is a block diagram of a vibration sensing WMU according to another embodiment of this invention.
Figure 4:
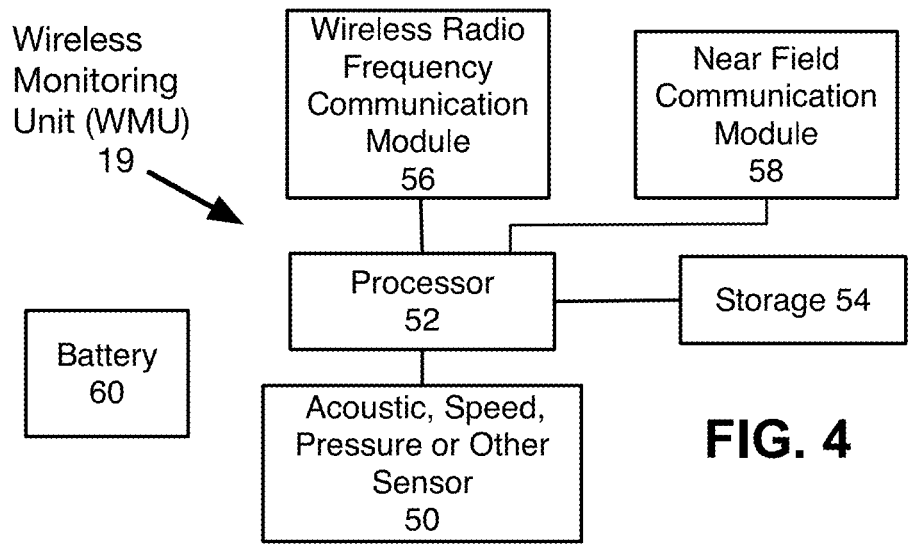
FIG. 4 is a block diagram of a WMU for sensing other diagnostic data.

FIGS. 2-4 show differing embodiments of a WMU. Each WMU 14, 17, 19 includes a housing, an antenna, an on/off switch, a sensor, a battery, and a circuit board with one or more circuit components mounted thereon. In a preferred embodiment each WMU 14, 17, 19 is permanently installed at a test location on a machine. By permanent, it is meant that the WMU 14, 17, 19 is to remain installed over a prolonged time period (of months) and will not be dislodged during normal machine operating conditions. It is expected that the battery of the WMU 14, 17, 19 will be replaced periodically, or as needed. In some embodiments the WMU 14, 17, 19 is mounted to the machine 12 with a magnet. In other embodiments, a fixture is used, such as a threaded post and correspondingly threaded receptacle. Accordingly, the WMU 14, 17, 19 also includes a mounting structure (such as a magnet, threaded opening, or threaded post) that serves to facilitate mounting of the WMU 14, 17, 19 to the machine 12.

FIG. 2 shows a block diagram of the WMU 14, according to an embodiment of the invention. The WMU 14 includes a first vibration sensor 42, a second vibration sensor 44, a temperature sensor 48, a processor 52, storage 54, a wireless radio frequency communication module 56, a near field communication module 58, and a battery 60. The second vibration sensor has a significantly lower power requirement and is used to take frequent vibration samples for determining whether the machine is running. In an example embodiment the second vibration sensor 44 is a MEMS device (e.g., micro-electro mechanical system (in US); micro-electro mechanical machine (in Japan)). The MEMS device draws an insignificant amount of power, but typically is unable to meet the metrological requirements for condition monitoring of a machine. Accordingly, the second sensor 44 is a low power vibrations sensor. In an example embodiment, the low power vibration sensor 44 draws less than 0.05 pAh of energy from the battery for a 5 second sample of vibration data along one axes acquired at 25 degrees C. In a more preferred embodiment the low power vibration sensor draws less than 0.02 pAh of energy from the battery for such a 5 second sample of vibration data acquired at 25 degrees C. In an exemplary embodiment, the low power vibration sensor is a MEMS device that draws approximately 0.016 pAh of energy from the battery for such a 5 second sample of vibration data acquired at 25 degrees C.

In a preferred embodiment the vibration sensor 42 is an accelerometer that senses the machine's vibration in x, y, and z axes, (e.g., one accelerometer unit measuring in each of the 3 axes; three accelerometers in which each one of the three measure in a respective one axis of the x, y, and z axes.) It offers comparatively high performance, in the sense that it has technical specification ratings that meet the metrological requirements for vibration measurements used to perform condition monitoring and diagnosis of the host machine. In an example embodiment the sensor 42 provides 3-axis synchronous acquisition with a 50+kS/s rate on each axis (i.e., x, y, and z axes), a 3 dB frequency bandwidth of 10 to 20 kHz on each axis, a signal to noise ratio of 85 to 115 dB; and exhibits an accuracy of +/−5% at 160 Hz. In a specific embodiment full-scale accelerometer detection is rated at 50 g. The bandwidth, signal to noise ratio, accuracy and other performance specifications may vary in other embodiments.

The low power vibration sensor 44 is a distinct component from the first vibration sensor 42. In a preferred embodiment the vibration sensor 44 is an accelerometer that senses the machine's vibration in a single axis. In other embodiments sensing along additional axes also may be included. However, sensing along one axis has been found to be effective for determining whether a machine is running, and results in less power consumption than for a sensor that can detect vibration along 3 axes.

Temperature sensor 48 also is a low power sensor. By low power in the context of a temperature sensor it is meant that the temperature sensor draws less than 0.1 pAh of energy from the battery for a temperature sample. In a preferred embodiment, the low power temperature sensor 48 is a MEMS device.

The processor 52 executes software made up of computer programs, databases, and other data constructs to define a software processing environment 62. (See FIG. 6.) The processor 52 is configured to activate and control the sensors 42-48 for taking samples of data. In some embodiments the processor 52 also is configured with condition-monitoring software for analyzing collected machine data, and with other software for performing automatic analysis of machine diagnostic data.

The storage 54 preferably is random access memory, flash memory, or nonvolatile memory having a capacity to store a most recent set of raw data collected by the sensors 42-50 for a test point assessment, along with the results derived therefrom (i.e., derived indicator values, automatic diagnosis results). It is preferred that the storage 54 has the capacity to manage a communication failure during communications with the gateway 16 without a loss of information. In other preferred embodiments, storage 54 has the capacity to store such data plus the derived indicator values for prescribed rolling window of time. Storage of the indicators for a rolling window of time allows evolution of the indicators to be reviewed to assess whether there is a trend. (e.g., for a full assessment performed once per day, the prescribed window is 30 days so that a set indicators is stored for each of the most recent 30 days.) In other embodiments, only the most recent raw data, indicator results, and automatic diagnosis results for a single full assessment are stored along with a trend of each indicator. The trend is stored rather than the rolling window of indicators from which the trend is derived. The trend is updated with each full assessment or at a prescribed time interval, (e.g., once per day).

The WMU 14 communicates with the gateway 18 (or another access point; or an interim device, such as a router) through a wireless radio frequency communication module 56. The wireless radio frequency communication module 56 maintains a wireless connection implementing a wireless radio frequency communication protocol, (e.g., ISA100.11a, wireless HART; SP100.11a (open standard); ZigBee™; 6LoWPAN (internet task force); a proprietary protocol such as a CyNet™ mesh network from Cyan Technology; a low power wide area network (LPWAN) such as by SIGFOX™; LoRa™; NEUL™; any 3G, 4G, or 5G, protocol; or any of the 802.11 family of standards.)

The near field communication module 58 allows the WMU 14 to link with a nearby near field communication enabled (NFC-enabled) device 20 by establishing radio-communication with the NFC-enabled device by touching them together or bringing them into near proximity, typically a distance of 10 cm (3.9 in) or less. The near field communication module 58 supports a near field communication protocol, such as defined by the ISO/IEC 18092 standard (based on the radio-frequency identification (RFID) standards including ISO/IEC 14443); as defined by other near field communication standards of the near field communication forum; and/or as defined by a near field communication standard(s) of the Groupe Speciale Mobile Association (GSMA) (e.g., Trusted Services Manager, single wire protocol, testing/certification and secure element protocol.) The processor 52 maintains a near field user interface 66 (see FIG. 3) for displaying command options and results of commands that are processed.

In the current state of the art, a wireless sensor unit, including a high performance vibration sensor and a battery of acceptable size and weight (selected at least in part so as not to interfere with vibration monitoring) which collects a full set of vibration data for a machine control once per day lasts about 3 months before the battery output diminishes to render the sensor unit ineffective. Of concern is that when the battery voltage output diminishes beyond a first threshold voltage, the sensor unit accuracy diminishes. When the battery voltage output diminishes beyond a lower threshold voltage, the sensor unit is unable to obtain and communicate data. Accordingly, the battery voltage output is monitored to determine when to replace the battery. According to a preferred embodiment of the invention, the WMU 14, 17 are controlled to be more efficient than such prior wireless sensor units. In a most preferred embodiment a D-cell battery of 17 Ah is used, and provides a battery life of up to 5 years when the WMU is operated to perform one vibration control measure per day at 25° C. ambient using the high performance vibration sensor, one vibration measure every 1-5 minutes using the low power vibration sensor, and one temperature sample every 1-5 minutes using the low power temperature sensor 48. In preferred embodiments batteries of lesser capacity are used which provide a battery life of 1 year or more when the WMU is used as described in this paragraph.

Such preferred and more preferred battery lifetimes are achieved by monitoring the machine's on/off (i.e., running) state and using the high performance sensor 42 to collect diagnostic data only while the machine is running. Measurements done while a machine is not running are useless for condition monitoring purposes, are power consuming, and generate useless traffic on the wireless network.

The low power vibration sensor 44 and the low power temperature sensor 48 are used to detect whether the host machine 12 is running. In selecting such sensors, their lower power requirements are prioritized over their measurement accuracy, so that the preferred (and more preferred) battery lifetime can be achieved. The temperature sensor 48 provides data that allows the processor to discern whether the vibration detected by the low power vibration sensor 44 originates at the local machine 12*a*, or instead is propagating to the local machine from a nearby machine 12*b*/12*c*/12*d*/12*e*. The temperature sensor 48, for example, may measure the temperature proximal to machine bearings for a WMU 14 installed at a test point 15 corresponding to such bearings.

FIG. 3 shows a block diagram of another embodiment of the wireless monitoring unit for vibration monitoring. WMU 17 has the same construction as WMU 14. Like parts are given like reference numbers. Accordingly, the structural description for the WMU 14 applies to that of WMU 17 for such like parts. The processor of each WMU 14, 17 also include common software modules. However, the processing also includes difference as described below in the description of the methods of operation and the software processing environment.

FIG. 4 shows a block diagram of another embodiment of the wireless monitoring unit for diagnostic monitoring of another type of diagnostic data. Like parts in FIG. 4 are given like reference numbers with regard to FIGS. 2 and 3. Accordingly, the structural description for the WMU 14 applies to that of WMU 19 for such like parts. The processor of each WMU 14, 17, 19 also include common software modules. However, the processing also includes difference because WMU 19 does not monitor vibration. Accordingly, the indicators being measured and the analysis of such indicators varies.

System of Wirelessly Monitoring Rotating Machines

Figure 5:
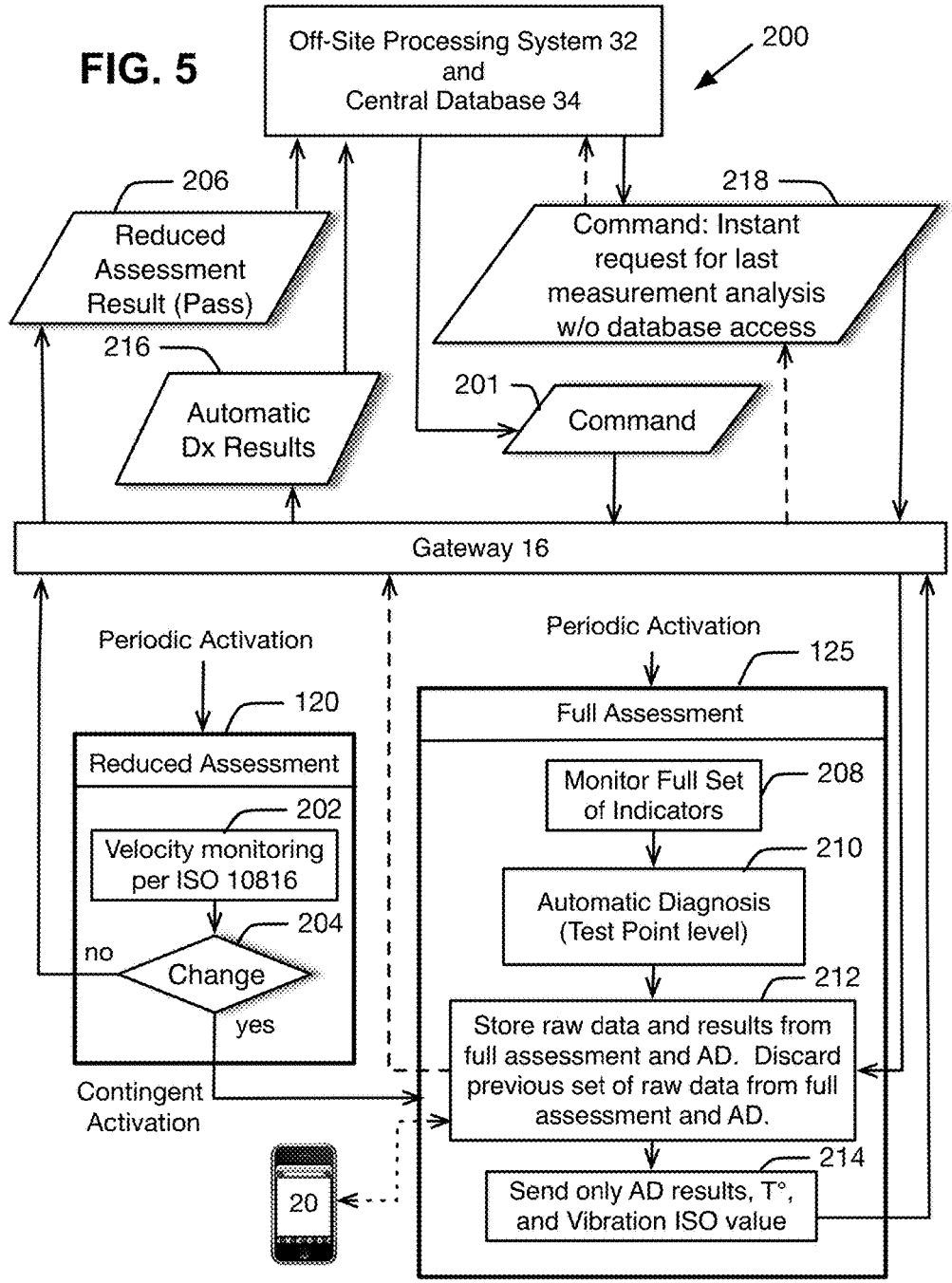
FIG. 5 is a data and control flow diagram for the power-efficient data-load-efficient method of wirelessly monitoring rotating machines, according to an embodiment of this invention.

FIG. 5 is a data and control flow diagram for the system 200 of wirelessly monitoring rotating machines, according to an embodiment of this invention. The system 200 is spread among multiple locations, including an on-site location at which the machines 12 being monitored are located and an off-site location (e.g., control room; site complex control center; regional control center) at which an off-site processing system 32 and central database 34 are located.

Commands 201 are sent over a wide area network to a gateway 16 at the on-site location, and routed to the destination WMU 14, 17 of the command. The respective WMU 14, 17 are configured by such commands to perform a reduced assessment 120 periodically at a prescribed periodicity.

A reduced assessment is a process controlled by the processor 52 of the destination WMU 14, 17. In a preferred embodiment a single vibration indicator, which is a reliable indicator of evolution of machine health of the host machine 12, is monitored for the reduced assessment. In a most preferred embodiment overall velocity is the single indicator that is monitored for the reduced assessment. Vibration data is acquired (202) by the vibration sensor 42 to achieve a measure of such overall velocity indicator. Monitoring of the overall velocity indicator is performed according to the ISO10816 standard guideline, (International Organization for Standardization, Geneva Switzerland.) When there is a change (204) in the alarm status according to the ISO10816 guideline (based on the machine classification) of the overall velocity between two measurements; OR when there is an evolution of the overall velocity of more than e.g. 10% (the percentage may vary), then a full assessment 125 is performed. When there is no such change, then the result 206 is sent to the off-site processing system 32 via the gateway 16. Such result 206 is a status indication that the reduced assessment passed, (i.e., there is no alarm condition of the overall velocity as evaluated per the ISO10816 guideline.)

The respective WMU 14, 17 also are configured by commands 201 to perform a full assessment 125 periodically at a prescribed periodicity. Such periodicity is longer than for the reduced assessment. A full assessment is a process controlled by the processor 52 of the destination WMU 14, 17. The process is periodically activated in accordance with the commanded periodicity. The process also is activated on a contingent basis. The contingency is when the reduced assessment detected the change (204) as discussed above with regard to the reduced assessment 120.

The full assessment 125 includes monitoring 208 a full set of indicators and performing automatic diagnosis 210 based on those indicators. Various vibration phenomena creating known patterns in measured spectra may be included among the full set of indicators. Indicators of vibration phenomena relating to blade pass, belt rate, gear mesh, flow noise, and adjacent components may be incorporated, such as by using forcing frequency parameters. In an example embodiment the following indicators are included in the full set of indicators:

"OVL ACC (g)": RMS Overall Acceleration
"OVL Velocity (mm/s)": RMS Overall Velocity;
"ACC HF (g)": Value of the High Frequency Acceleration Energy band (g);
"ACC LF (g)": Value of the Low Frequency Acceleration Energy band (g);
"ACC MF (g)": Value of the Medium Frequency Acceleration Energy band (g);
"DEF": ACOEM Bearing Defect Algorithm, giving indication on the bearing health grade (Similar to a crest factor);
"Shock": ACOEM Shock Detection Algorithm characterizing the presence of shocks (YES/NO);
"H0 (mm/s)": Amplitude of the First Harmonic of the rotation speed extracted on the velocity spectrum;
"H1 (mm/s)": Amplitude of the Second Harmonic of the rotation speed velocity spectrum;
"H2 (mm/s)": Amplitude of the Third Harmonic of the rotation speed velocity spectrum;
"H0 (g)": Amplitude of the First Harmonic of the rotation speed extracted on the acceleration spectrum;
"H1 (g)": Amplitude of the Second Harmonic of the rotation speed extracted on the acceleration spectrum;
"H2 (g)": Amplitude of the Third Harmonic of the rotation speed extracted on the acceleration spectrum;
"Ku": Kurtosis.

Vibration data is collected by the vibration sensor 42 to achieve a measure for each one of these indicators in the full set. Automatic diagnosis 210 is performed based on measures of such full set of indicators. In an example embodiment, automatic diagnosis pertaining to vibration includes fault detection, vibration analysis, fast Fourier transform analysis, and shock analysis. In WMU having a sensor in addition to or other than a vibration sensor, automatic diagnosis also may include temperature analysis, noise analysis, or pressure analysis, according to the type of sensor.

The results of the automatic diagnosis 125 include fault conditions detected, alarms detected, or other results. The analysis, including indicators, conditions monitored, screening criteria, and algorithms of the automatic diagnosis encompass those described in the related specification cited above of Wascat et al. for "Automatic Rotating-Machine Fault Diagnosis With Confidence Level Indication."

In a preferred embodiment a set of data stored for a full assessment includes raw data, a set of indicators, and automatic diagnosis results. The set of indicators preferably include: overall RMS vibration velocity, acceleration, and others (e.g., bearing health indicator, shock detection indicator, detection of harmonics.) The raw data preferably includes:

low frequency fast fourier transforms (FFT): 0-200 Hx, 800 lines, 5 averages, 75% overlap;
medium frequency FFT: 0-2000 Hz, 1600 lines, 10 averages, 75% overlap, high frequency FFT: 0-20000 Hz, 800 lines, 20 averages, 75% overlap;

time waveform sampled at 51.2 kHz (Fmax 20 kHz), with up to 16000 samples.

Each time a full assessment 125 is performed, a current set of the corresponding sample data acquired and indicator measures derived, along with the results of the automatic diagnosis are stored 212 as as a data set in storage 54. Such data set corresponds to one set of data for one full assessment. For an optimal low power solution, only one data set is maintained. Once a complete data set is obtained for the next full assessment the old data set may be deleted. In other embodiments a rolling window of data sets are maintained, (e.g., 3.) In a preferred embodiment the indicator measures for multiple full assessments are also maintained as a rolling window of indicator results. For example, for a full assessment performed once per day, a set of indicator values is stored for each of the past 30 days. In another embodiment, rather than store the indicator values for more than the most recent full assessment, only a trend value for each indicator is stored along with the current indicator values.

The results of the automatic diagnosis (AD) are sent 214 to the off-site processing system 32 via the gateway 16. In embodiments having a temperature sensor (e.g., sensors 48, 50) the acquired temperature value also is sent with the automatic diagnosis results. In contingent activations of the full assessment 125, the overall vibration measure, as determined per the ISO10816 guideline during the execution of the reduced assessment 120, also is sent with the automatic diagnosis results.

The off-site processing system may send various commands to configure and control the WMU 14, 17, 19. Because the raw data is not being sent as part of the reduced assessment or full assessment, a command 218 is issued on a select basis to request that the latest data set(s) in the rolling window of data sets in storage 54 of the WMU be sent. The processor 52 of the WMU processes such command and sends the data set. In some embodiments the select basis is for every contingent activation of the full assessment 125. In other embodiments, differing screening criteria is applied to select when to issue the command 218. In other embodiments, the command is issued routinely in response to receiving the automatic diagnosis results from any full assessment 125, regardless of whether the full assessment was a contingent activation or a periodic activation.

Software Processing Environment 62

Figure 6:
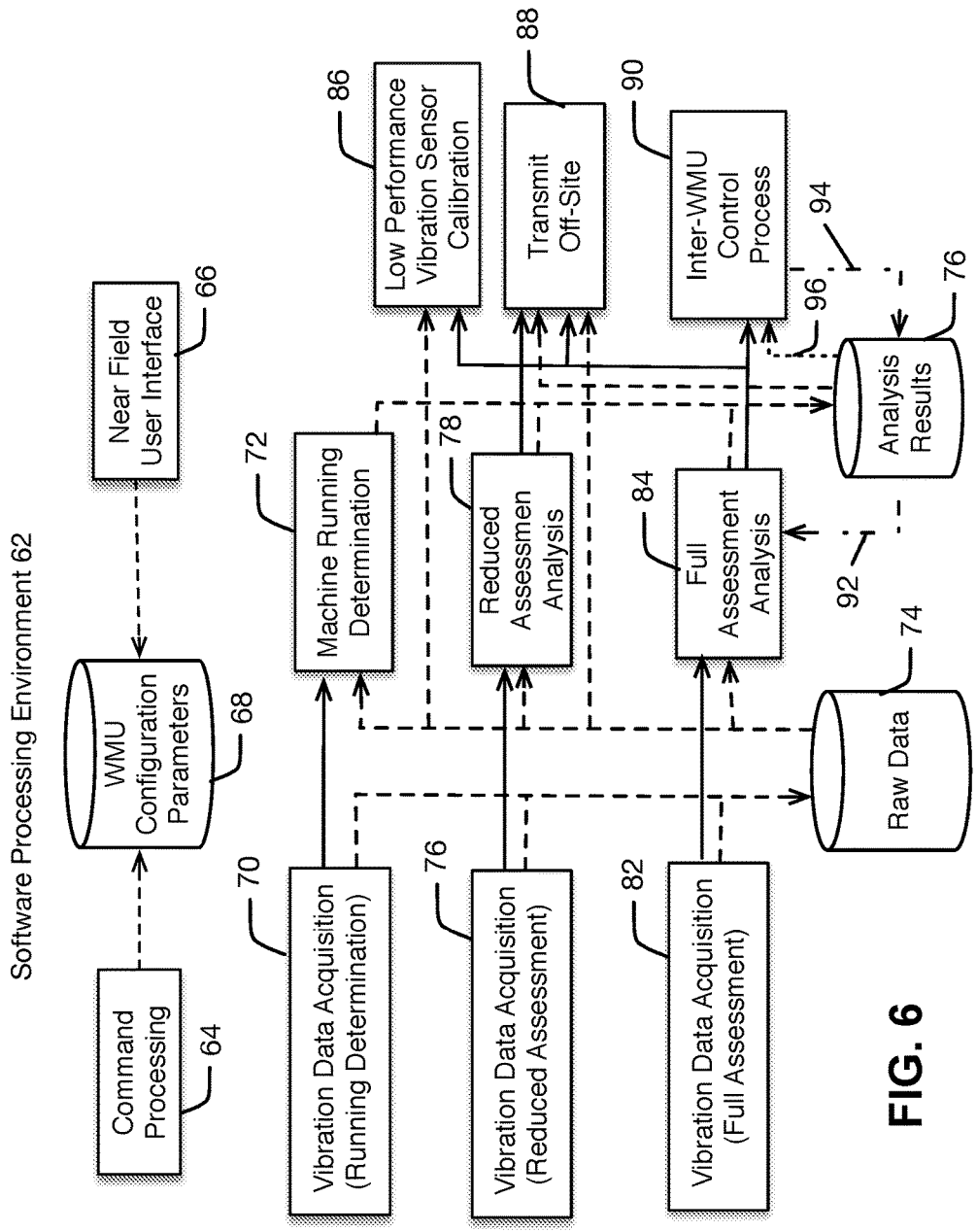
FIG. 6 is diagram of the software processing environment of the processor of the vibration sensing WMU, according to an embodiment of this invention.

Referring to FIG. 6, the processor 52 executes software made up of computer programs, databases, and other data constructs to define the software processing environment 62. The processor of each WMU 14, 17 controls several workflows. One workflow is to perform a reduced assessment analysis of the test point 15. Another workflow is to perform a full assessment analysis of the test point 15—or of the host machine as a whole. For WMU 14, another workflow is to periodically determine whether the host machine is running, (i.e., see the related specification of Wascat et al. for "The power-efficient data-load-efficient method of wirelessly monitoring rotating machines.")

In addition to these workflows, the processor 52 performs command processing as needed, and manages a near field communication user interface 66. In some embodiments, the processor 52 also manages a workflow shared by the multiple WMU 14, 17, 19 of the host machine, (e.g., for full assessments of the machine as a whole one WMU serves as a primary unit, while the other WMU serve as secondary unit(s).)

The processing environment 62 includes a command processing module 64 for processing commands received from (i) the online processing center 34 (via the wireless radio frequency network 18); and (ii) from a local user (via a near-field-communication enabled device 20 (NFC-enabled device) (e.g., a smartphone; a tablet computer); a near-field link 22.)

A near-field communication user interface process 66 allows a user operating the NFC-enabled device 20 to request to view data and analysis results; to command that the corresponding WMU 14, 17 to perform a test point health assessment or other condition monitoring; and to configure the ongoing operations of such WMU 14, 17. WMU configuration parameters 68 are set in response to commands from the off-site processing system 34, NFC-enabled device 20, other WMU 14,17, and are stored in storage 54.

Among the WMU configuration parameters 68 are time intervals that define how often various processes are executed. A significant function of each WMU 14, 17 is to collect machine diagnostic data and perform a health assessment of the corresponding test point 15 of the host machine 12a at which the WMU 14, 17 is installed. One parameter 68 defines how often such a health assessment is performed for the test point 15 at which the given WMU 14, 17 is installed. Different WMU 14, 17a, 17b may have the same or differing time intervals between health assessments for their respective test points 15a-15c. A typical time interval is once per day, although other time intervals may be used. Another parameter 68 defines how often a reduced assessment is performed for the test point 15 at which the given WMU 14, 17 is installed. A typical time interval is once every hour, although other time intervals may be used. Still another parameter 68 defines how often the machine state is evaluated to determine whether the host machine 12 is running. A typical time interval is once every 1-5 minutes, although other time intervals may be used. Still other parameters 68 determine how the machine state is to be evaluated and whether to include various options—as discussed below in more detail.

In the configuration depicted in FIG. 6 there are three primary workflows. One workflow is to determine whether the host machine 12 is running. Periodically, the low power sensor 44 is activated to acquire a vibration measurement of the host machine, (i.e., vibration data acquisition 70). The acquired data is stored locally in storage 54 as raw data 74, then analyzed (machine running determination process 72.) The results are stored in storage 54 in an analysis results database 76.

A second workflow is to periodically perform a reduced assessment of the local test point. Such assessment is based on a reduced set of measurements (relative to a full set used to perform a full assessment of the test point or host machine.) Periodically, the vibration sensor 42 is activated to acquire one or more vibration measurements of the host machine, (i.e., vibration data acquisition 76). The acquired data is stored locally in storage 54 as raw data 74, then analyzed (reduced assessment process 78.) The results are stored in storage 54 in an analysis results database 76. In some embodiments the analysis results also are transmitted off-site (transmit off-site process 88) to a central database 36 for access by the off-site processing system 34.

A third workflow is to periodically perform a full assessment of the local test point 15 (or host machine 12) Such assessment is based on a full set of indicators, as discussed above. Periodically, the vibration sensor 42 is activated to acquire vibration data samples to obtain measures of such indicators, (i.e., vibration data acquisition 82). The acquired data is stored locally in storage 54 as raw data 74, then analyzed (full assessment process 84.) The results are stored in storage 54 in an analysis results database 76. The analysis results also are transmitted off-site (transmit off-site process 88) to a central database 36 for access by the off-site processing system 34.

The full assessment includes condition monitoring 82 includes any one or more of the following: detect mass unbalance, misalignment, a mounting defect, moving part looseness, structural resonance, a lubrication defect, rolling element bearings defects (e.g., pitting, general wear), gear defects (e.g., tooth wear, broken tooth, backlash), and cavitation. Automatic diagnosis may include any one or more of vibration level analysis, time wave analysis, spectral analysis, and vector analysis of vibration data and other diagnostic data.

In some embodiments, either one or both of the low power vibration sensor 44 and low power temperature sensor 48 are low performance sensors 44', 48'. For such embodiments the software processing environment 62 also includes a calibration module, such as a low-performance vibration sensor calibration module 86.

Power Efficient Method for Diagnostic Monitoring at a Test Point of a Machine

Figure 7:
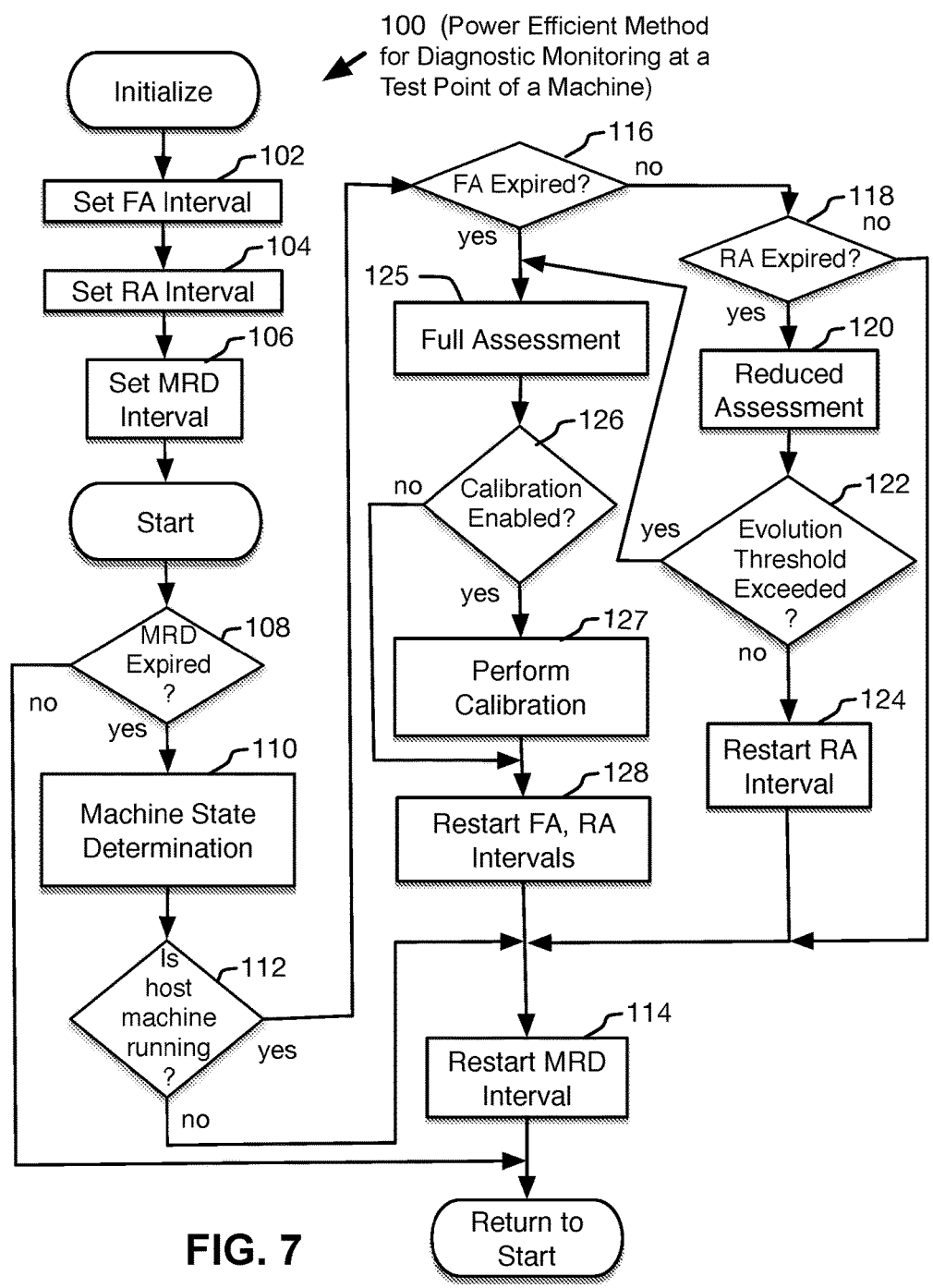
FIG. 7 is a flow chart of a power efficient method for diagnostic monitoring of a test point of a machine, according to an embodiment of this invention.

FIG. 7 is a flow chart of a method 100 for controlling the three primary workflows of a given WMU 14, 17. Each workflow is performed periodically at a different periodicity. The machine state determination is performed most often. A reduced health assessment is performed more often that the machine state determination, but less often than a full health assessment. The method is executed by the processor 52. Upon initialization of the method 100, the parameters for the three time intervals corresponding to the respective workflows are used to set a timing scheme for performing the respective workflows. At step 102 the full assessment (FA) time interval is set. At step 104 the reduced assessment (RA) time interval is set. At step 106 the machine running determination (MRD) time interval is set.

The MRD interval expires first. At step 108 the processor test an MRD timer. If not expired, then the process skips the remaining steps and returns to a start point. When the MRD interval expires, the processor 52 executes the machine state determination process 110. The results of such process 110 provide a determination of whether the host machine is running. Such results are tested at step 112. When the indication is that the machine is not running then at step 114 the MRD interval is reset, and processing jumps back to start.

When the indication is that the host machine 12 is running, then at step 116 the full assessment timer is tested to see if the interval has lapsed making a full assessment due. When the full assessment interval has not lapsed, then at step 118 the reduced assessment timer is tested to see whether the reduced assessment interval has lapsed. When the reduced assessment interval has lapsed, a reduced assessment 120 is performed. The results of the reduced assessment are tested at step 122. If the results indicate that there has been a change in a tested condition for the corresponding test point 15 that exceeds a threshold, then a full assessment 125 is to be performed. If the results of step 122 do not indicate such a change in any of the tested conditions, then the reduced assessment interval is rest at step 124. The MRD interval then is reset at step 114 and processing returns to start for another iteration.

There will be iterations where none of the FA interval, RA interval or MRD interval lapse. Eventually, there will be an iteration where both the MRD interval and RA interval have lapsed. Less frequently, there will be an iteration where both the FA interval and MRD interval have lapsed. For such iteration step 116 will indicate such lapsing resulting in the full assessment process 125 being performed. Thereafter, at step 128 the FA interval and the RA interval are reset (regardless of whether the RA interval has lapsed). The MRD interval then is rest at step 114 and processing returns to start for another iteration.

For a WMU 14 which includes a low performance vibration sensor 44', a calibration may be performed each time a full assessment is performed. In particular, when fresh data is available from the sensor 42 the accuracy of the low performance sensor 44' can be tested. At step 127 a calibration evaluation process is performed. Additional description of the calibration evaluation process 86, performed at step 127, is found in the related specification, incorporated herein by reference, as cited above in the Related Specifications section. Although the calibration evaluation is shown as being performed after the full assessment process, in other embodiments the low performance vibration sensor 44' is re-evaluated more frequently, such as after the reduced assessment process performed at step 120. Further the calibration evaluation process 86 may be performed during the full assessment of step 125 or the reduced assessment of step 120 after the corresponding data acquisition 76, 82.

Machine State Determination

Figure 8:
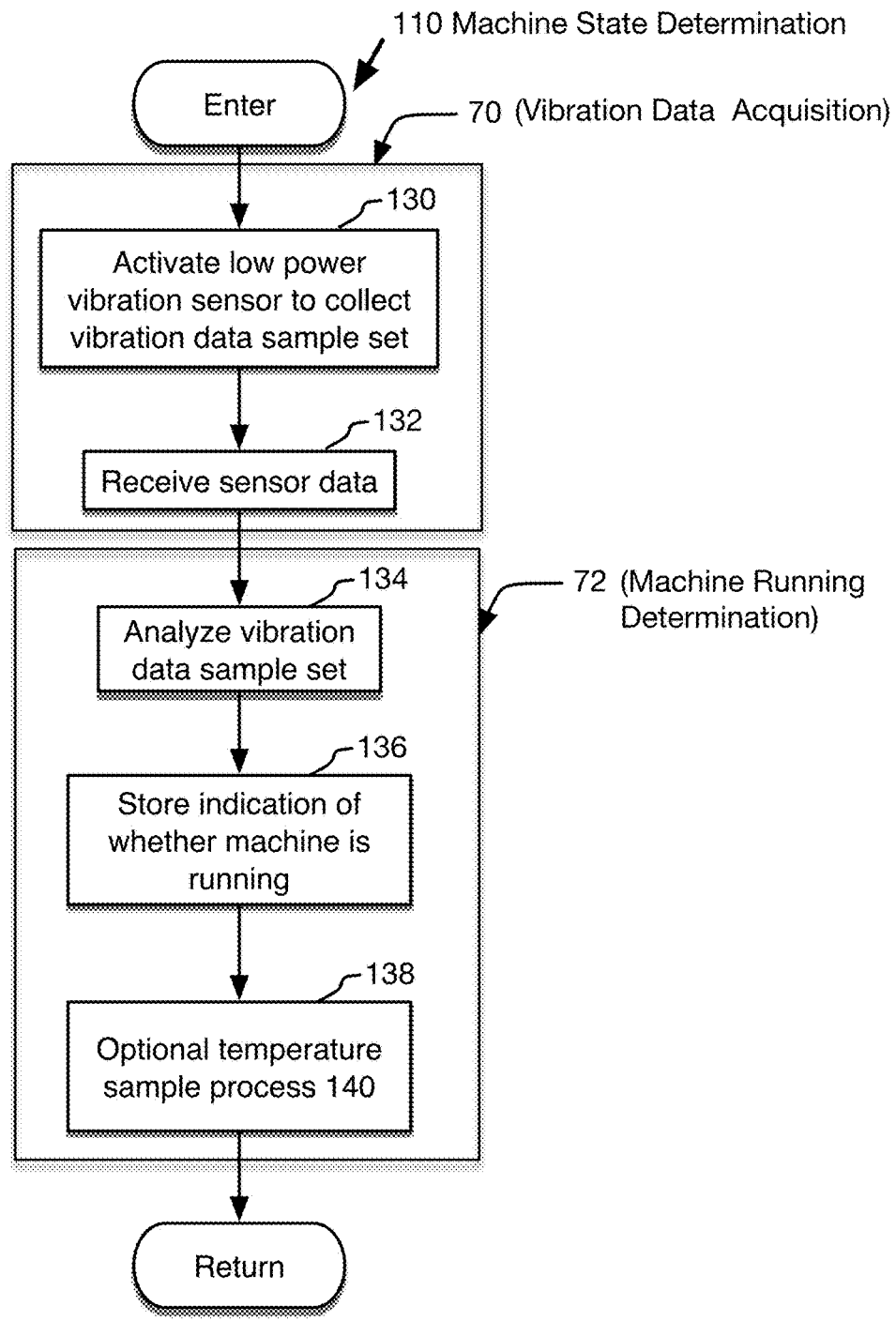
FIG. 8 is a flow chart of a method for determining whether a host machine is running, according to an embodiment of this invention.

FIG. 8 is a flow chart of the machine state determination process 129, according to an embodiment of this invention. At steps 130 and 132 the vibration data acquisition process 70 is performed. At step 130, the processor 52 activates the low power vibration sensor 44 to begin sensing vibration. At step 132 the processor receives and stores a time sequence of raw sensor data from sensor 44. The length of time during which a vibration sample is collected for processing by the processor 52 is a configuration parameter that may be set by an operator, (e.g., sent via a command from the off-site processing system 34; or from a local operator via near field communication using a NFC-enabled device 20.) At step 134 the raw data is processed. A determination is made based on the analysis of the raw data whether the machine is running, and stored at step 136.

Various tests may be implemented to make a determination that a machine is running. In an example embodiment, a mean velocity is computed for the sample interval (e.g., 5 second) for which vibration data is collected. A mean value is preferred to avoid a random shock triggering a determination that the machine 12 is running. If the mean velocity is found to exceed a threshold velocity, then the vibration analysis indicates that the machine is running.

When the host machine 12a is stopped (i.e., not running) the vibration should be closed to 0 mm/s. When the machine is running, the vibration for an example machine is approximately 1 mm/s for a healthy machine. However the specific vibration for a given machine is highly dependent on the type and speed of machine and the installation environment. Accordingly, the specific velocity threshold value to distinguish between a stopped machine and a running machine will vary for the host machine, and may be set by the end user by command as a configuration parameter.

In another embodiment, an additional test or alternative test may be implemented in which the mean velocity is compared to the mean velocity computed during a previous iteration of steps 106-110 to detect an evolution of the mean velocity. A threshold percent of change or absolute change is another configuration parameter that is set by command based upon the type of host machine. In a given embodiment both tests are implemented. When either of the tests results in a finding that the machine 12 is running, then the machine state—as based on vibration analysis—is determined to be running.

In various embodiments, any of the following vibration measures can be used to determine whether the machine is running by comparing the measure to a corresponding threshold parameter or change parameter: acceleration, velocity, or displacement. Such measure is any one of an RMS, peak, peak to peak, average or max value measure. Using an average value is desirable to prevent an anomalous shock from providing a false trigger.

In some embodiments temperature also is considered in determining whether the machine is running. Additional description of the machine state determination process and embodiments thereof is found in the related specification, incorporated herein by reference, as cited above in the Related Specifications section.

Reduced Assessment 120

Figure 9:
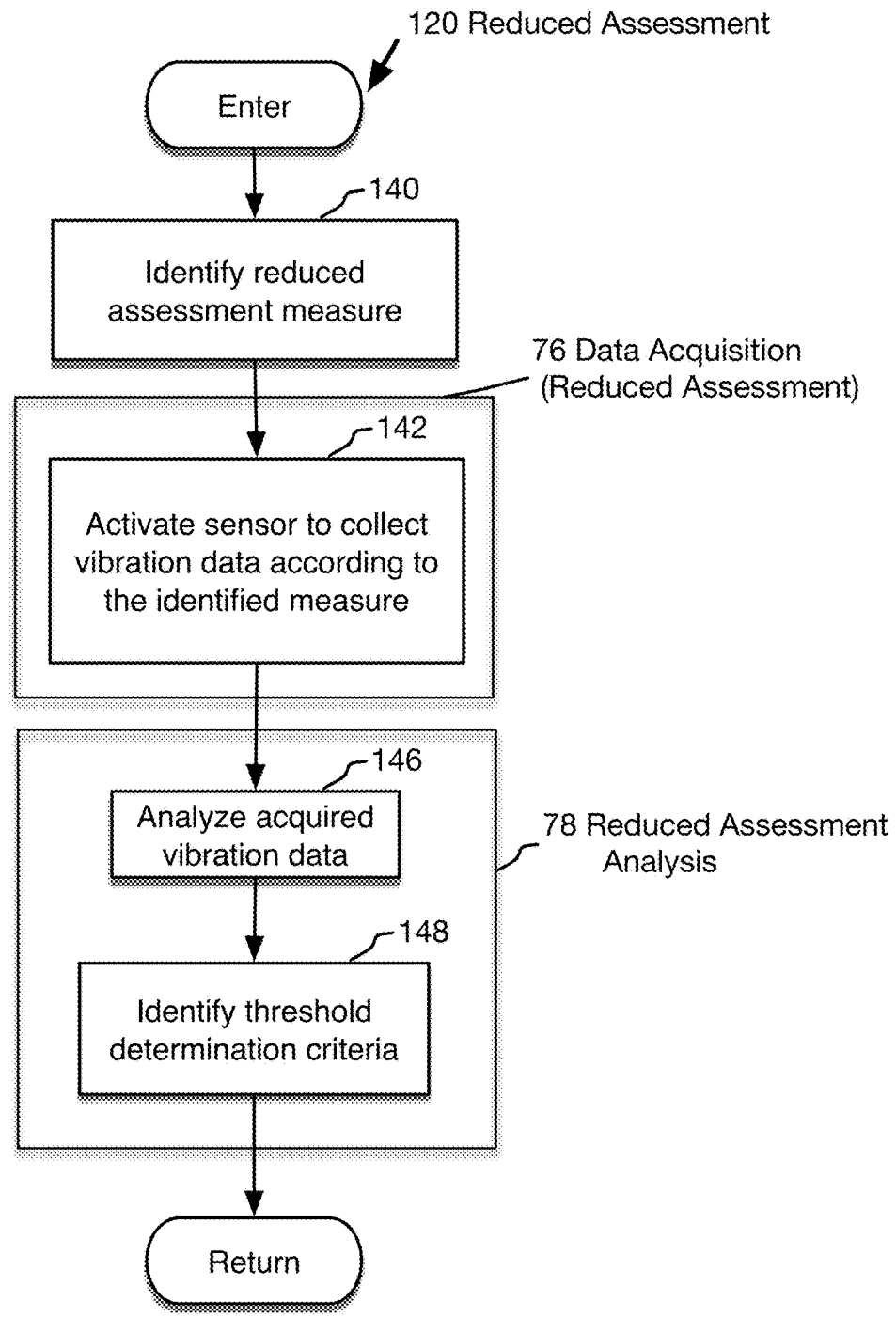
FIG. 9 is a flow chart of a method for performing a reduced assessment of a test point, according to an embodiment of the present invention.

FIG. 9 is a flow chart of the reduced assessment processing, according to an embodiment of this invention. At step 140 the measure to be performed is identified, as per configuration parameters, which identify such measure(s). In a preferred embodiment, the reduced assessment is an analysis of the overall velocity detected by the vibration sensor 42. At step 142 the vibration sensor 42 is activated, and vibration data is acquired and stored as raw data 74 in storage 54. The reduced assessment analysis 78 then is performed at steps 146 and 148. At step 146, the acquired data is analyzed to derive the overall velocity measure for a prescribed sample period. (e.g., 5 seconds.) The derived value is stored in storage 54 in an analysis results database 76. Such measure is compared to previous values of such same measure. In an example embodiment the overall velocity measure is measured and monitored according to the ISO10816 standard guideline. If there is a change in the alarm status according to the ISO10816 guideline (based on the machine classification) of the overall velocity between two measurements OR if there is an evolution of the vibration velocity of more than e.g. 10% (configurable), then the full measurement set is automatically triggered so that the automatic diagnosis is performed.

At step 148, an evaluation criteria parameter is identified from among the configuration parameters 68. If the threshold value has changed from the previous value by a threshold absolute amount, then at step 122 (of FIG. 5) the reduced assessment has identified a concern causing a full assessment to be performed. In other embodiments, a threshold percent is the criteria. In other embodiments, the criteria encompasses a time interval of multiple measurements (i.e., derived from a prior sequence of repetitions of the reduced assessment process 120) rather than just the previous measure.

Full Assessment 125 (Test Point Level of Analysis)

When the reduced assessment indicates an evolutionary change that triggers the threshold, the full assessment is performed. Also, when the full assessment time interval lapses, the full assessment is performed, (i.e., if the machine is determined to be in a running state.)

Figure 10:
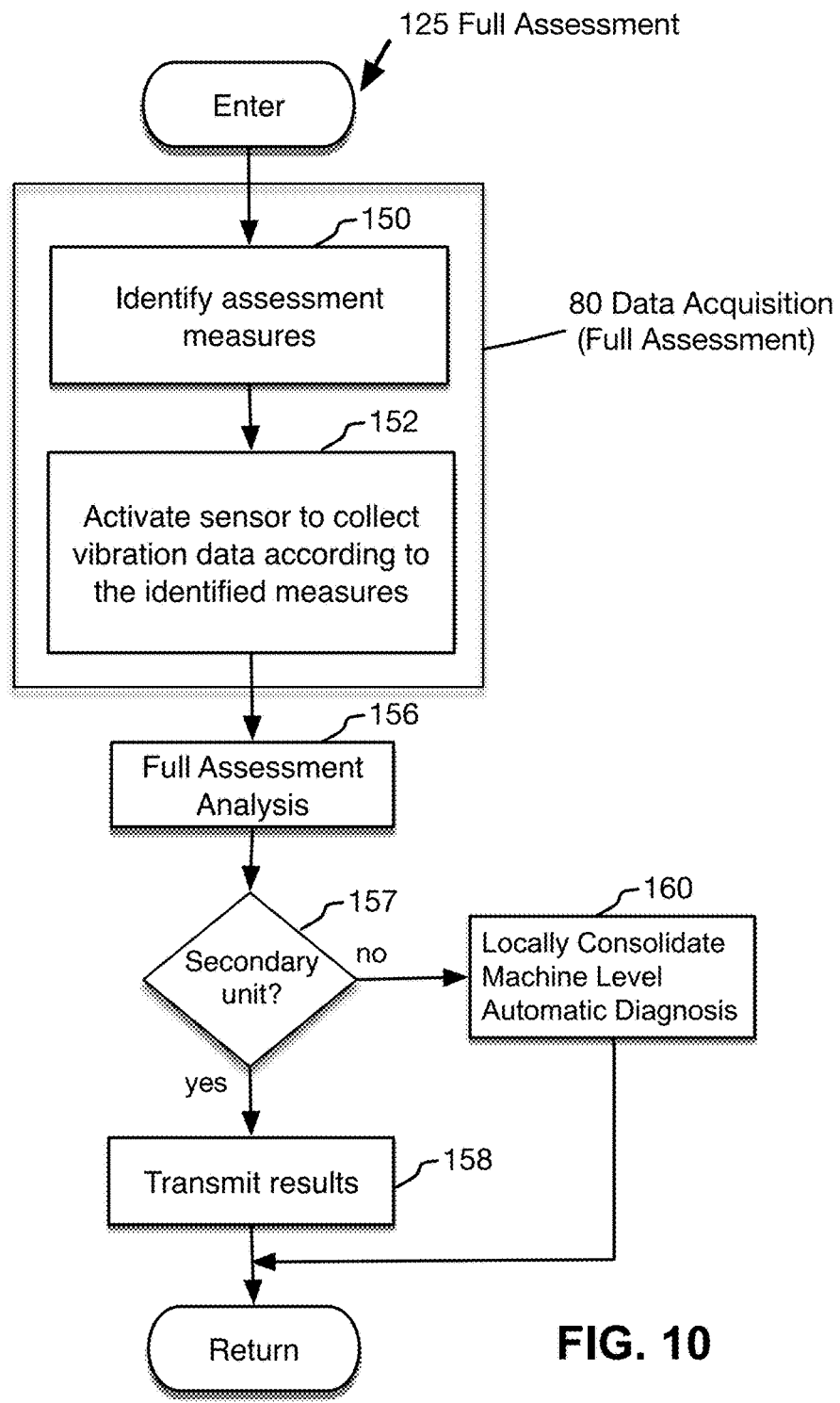
FIG. 10 is a flow chart of a method for performing a full assessment of a test point, according to an embodiment of the present invention.

FIG. 10 is a flow chart of the full assessment 125, according to an embodiment of this invention. At steps 150 and 152 the vibration acquisition process 80 is performed. At step 150 the full set of measures to be performed is identified. At step 152 the vibration sensor 42 is activated, and vibration data is acquired and stored as raw data 74 in storage 54. The full assessment analysis 82 then is performed at steps 156 and 158. At step 156, the acquired data is analyzed to derive indicator measures. The derived indicator measures are stored in storage 54 in an analysis results database 76. At step 158, the results of the full assessment of the test point are transmitted. In an example embodiment, the results (i.e., indicators and automatic diagnosis results) of the full assessment of the test point are transmitted through the wireless radio frequency communication module 56 to the central database 36 via the gateway 16. In an embodiment in which WMU is serving as a secondary WMU, the results of the full assessment of the test point are transmitted through the wireless radio frequency communication module 56 to the primary WMU for the host machine 12.

Of significance is that the data acquired form the single test point at which a given WMU 14, 17 is mounted is providing only some of the data and indicator measures needed to provide an automatic diagnosis.

Locally Consolidated Machine Level Automatic Diagnosis

In some embodiments, one of the WMU 14, 17 serves as a primary unit while the other WMU 14, 17, 19 serve as secondary units. In such an embodiment, the secondary units are configured to send their automatic diagnosis results to the primary unit at step 158 of their locally executed full assessment 125.

Figure 11:
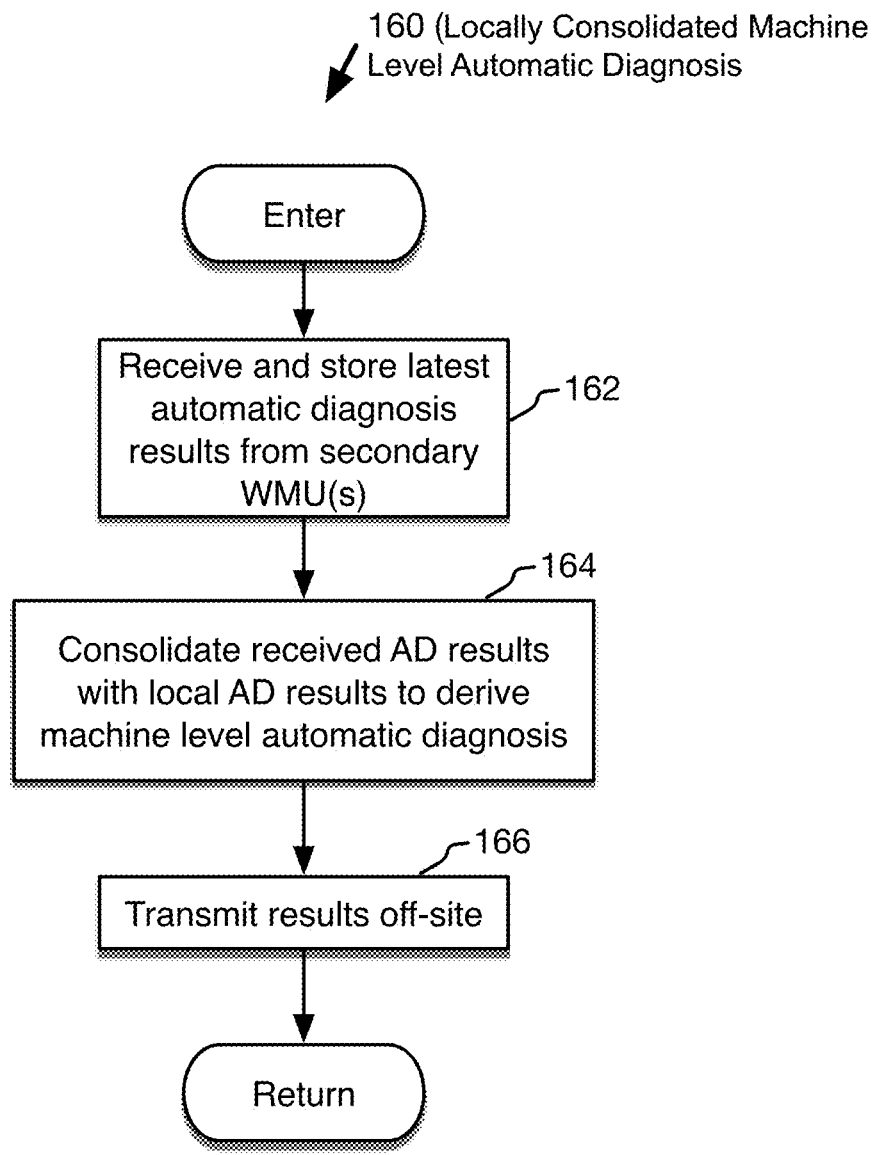
FIG. 11 is a flow chart of a method for performing a full assessment of a test point in response to a command, according to an embodiment of the present invention.

FIG. 11 shows a flow chart of a process 160 performed by the processor 52 of the primary WMU of a host machine 12. At step 162 the automatic diagnosis results are received from the secondary units and stored in storage 54. For each execution of the full assessment 125 of the primary unit, process 160 is executed. At step 164, the latest automatic diagnosis results stored in storage 54 for each secondary unit are accessed, so as to derive a machine level diagnosis. The machine level automatic diagnosis then is transmitted off-site at step 166.

In some embodiments, the local consolidation process 160 includes a step to examine a timestamp associated with the communication of the latest automatic diagnosis results for each secondary unit. When the timestamp is older than a prescribed time interval, the primary unit sends a request to the off-site processing system 32, or directly to the secondary unit via the wireless radio frequency network 18, requesting that the secondary unit perform a full assessment 125. The process 160 further includes a step to wake itself periodically to determine whether the test point automatic diagnosis results have been received from such secondary unit(s). The test point automatic diagnosis results for each secondary unit then are consolidated with those of the primary unit to derive a machine level diagnosis. The machine level automatic diagnosis then is transmitted off-site at step 166.

Figure 12:
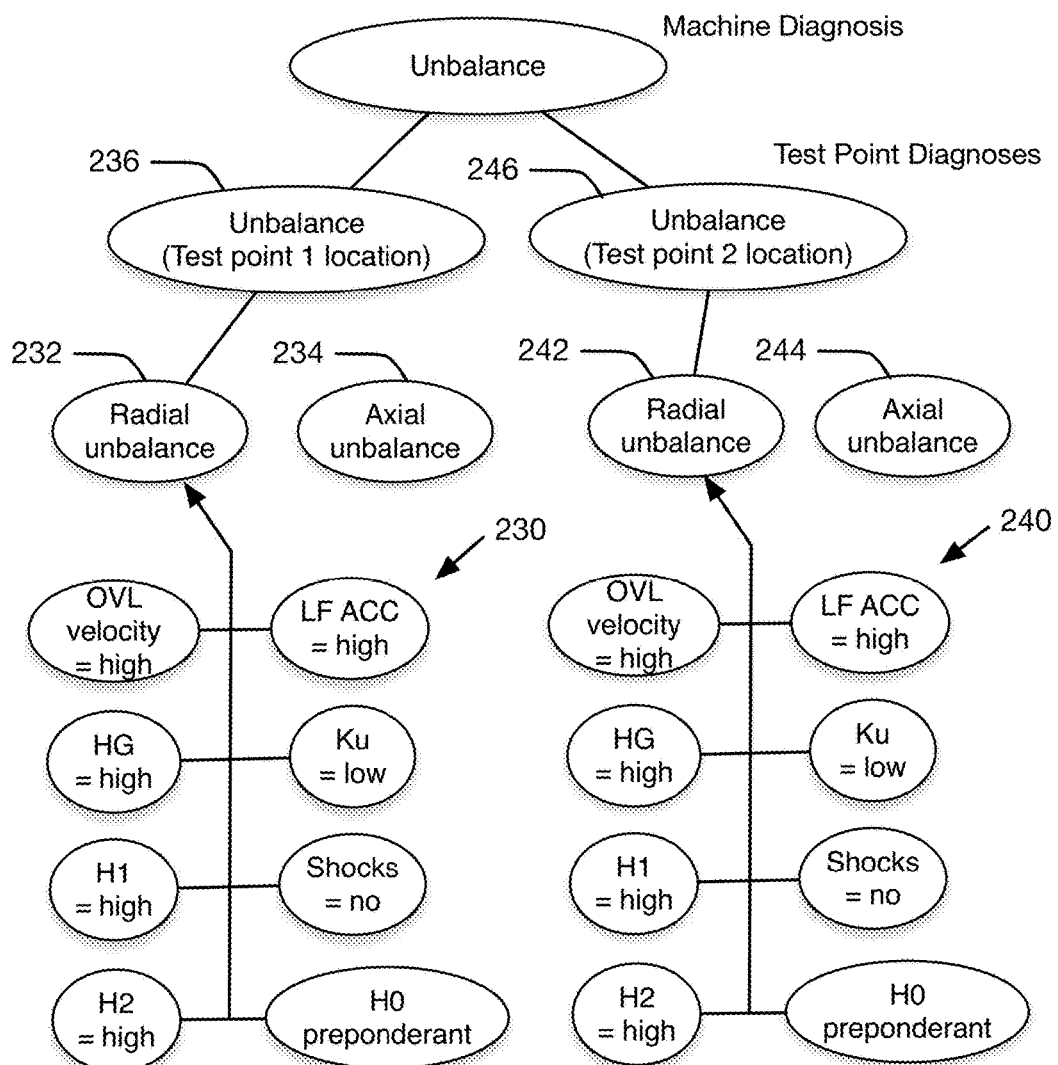
FIG. 12 is a diagram of test point automatic diagnosis results being consolidation to form machine automatic diagnosis results for an unbalanced diagnosis, according to an embodiment of the present invention.

An example of consolidating automatic diagnosis results is shown in FIG. 12 for an unbalanced checking for symptoms of unbalance in radial and axial directions of multiple test point locations. The symptoms 230 are tested at a secondary unit for each of radial unbalance 232 and axial unbalance 234. The results are a test point diagnosis 236 pertaining to unbalance at test point location 1. Similarly, the symptoms 240 are tested at the primary unit (or another secondary unit) for each of radial unbalance 242 and axial unbalance 244. The results are a test point diagnosis 246 pertaining to unbalance at test point location 2. The results of the two test points are consolidated to determine whether the machine as a whole is unbalanced. For example, there is a threshold degree of unbalance required for unbalance to register as machine unbalance. In some instances, there is unbalance at each of test point 1 and test point 2, which, respectively, do not exceed a threshold at the test point level of analysis. However, in an example instance they accumulate to exceed the threshold for the machine as a whole. In other instances there is unbalance at each of test point 1 and test point 2, which, respectively, do exceed a threshold at the test point level of analysis. However, in an example instance they accumulate to cancel out in part, so that the threshold for the machine as a whole is not exceeded.

Near Field Communication

According to the embodiments described above, diagnostic data acquisition, monitoring of diagnostic indicators, and automatic diagnosis are performed periodically. Of significance, absent a specific command requesting raw data, the raw data and indicator measurements are not sent over the wireless radio frequency network 18 to the off-site processing system 32 or central data 34. Accordingly, there is a need provide access to such information to users on request. In one scenario, a technician having expertise in analyzing vibration data measures needs to be given remote access to such raw data and measurements, in order to perform an in-depth analysis. In another scenario, a user visits the machine site and is to check the machine health status while being present at the machine. Both applications rely on the capability of the system 200 to keep the rolling window of indicator measurements in addition to the most recent set of raw data, the most recent set of indicator results, and the most recent automatic diagnosis results for a full assessment in storage 54. As previously described, in other embodiments a trend for each indicator is stored rather than the rolling window of indicator results.

An expert or other user may access the rolling window of measurements and the results of the automatic diagnosis in storage 54 through the near-field communication interface 58. Of significance is that this capability is being delivered without the need to put any of such data onto the wireless radio frequency network 18. Accordingly, data load on the wireless radio frequency network is unaffected.

In order to maintain a minimal power requirement for the WMU 14, 17, 19, there is no integrated display in the WMU. However, a user having a NFC-enabled device 20 can display instantaneously on the device 20 the contents of the storage 54, such as the indicator measurements and/or automatic diagnosis results of the last full assessment 125 (and reduced assessment 120.) The user can then read the results from his device 20 by merely being in close proximity to the host machine 12 without being constrained by the specific WMU 14, 17, 19 test point location.

Other Remarks

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A method for remotely monitoring a plurality of machines located at a common site, each one machine of the plurality of machines having at least one wireless monitoring unit capable of wirelessly linking with a gateway located at the common site, said one wireless monitoring unit comprising a processor, storage, a vibration sensor, and a wireless radio frequency communication module, the method comprising:

periodically performing a preliminary assessment of a first indicator set of diagnostic health of said one machine with said one wireless monitoring unit, said preliminary assessment comprising acquiring first vibration data with said vibration sensor, deriving by said processor said first set of indicators from the acquired first vibration data; storing said derived first indicator set in said storage, and analyzing said derived first indicator set for a threshold change relative to a derived first indicator set from a previous performing of said preliminary assessment to derive one of either a pass result or a fail result;

when a current performing of said preliminary assessment has the pass result, automatically sending a first communication off-site through the gateway indicative of the pass result;

wherein all automatic communication off-site responsive to said deriving a pass result excludes said derived first indicator set and the acquired first vibration data;

when the current performing of said preliminary assessment has the fail result, performing a primary assessment of a second set of indicators of diagnostic health of said one machine with said one wireless monitoring unit, said primary assessment comprising acquiring second vibration data with said vibration sensor; deriving by said processor said second set of indicators from the acquired second vibration data; storing said acquired second vibration data and said derived second set of indicators in said storage, and analyzing said derived second set of indicators to perform automatic diagnosis corresponding to a location of said one wireless monitoring unit;

for each performing of said primary assessment responsive to said current performing of said preliminary assessment having said fail result, automatically transmitting with the wireless radio frequency communication module a second communication comprising results of said automatic diagnosis and a diagnosis of the derived first indicator set that led to the fail result of the corresponding preliminary assessment; and wherein all automatic communication through the wireless radio frequency communication module responsive to said deriving the fail result excludes said acquired first vibration data, said acquired second vibration data, said derived first indicator set, and said derived second set of indicators.

2. The method of claim 1, wherein said first indicator set consists of overall velocity.

3. The method of claim 2, wherein said second set of indicators comprises at least four indicators from the group of indicators consisting of: overall acceleration; overall velocity; a value of a high frequency acceleration energy band; a value of a low frequency acceleration energy band; a value of a medium frequency acceleration energy band; an indicator of bearing health grade; a binary indicator of shock presence; an amplitude of a first harmonic of predefined or obtained rotation speed extracted on a velocity spectrum; an amplitude of a second harmonic of the rotation speed extracted on the velocity spectrum; an amplitude of a third harmonic of the rotation speed extracted on the velocity spectrum; an amplitude of a first harmonic of the rotation speed extracted on an acceleration spectrum; an amplitude of a second harmonic of the rotation speed extracted on an acceleration spectrum; an amplitude of a third harmonic of the rotation speed extracted on an acceleration spectrum; and kurtosis.

4. The method of claim 1, wherein for each performing of said primary assessment the corresponding acquired second vibration data, the derived second set of indicators, and the automatic diagnosis together are a corresponding data set; and further comprising:
maintaining said derived second set of indicators in storage for each of 'n' most recently performed primary assessments as a rolling window of second sets;
erasing an oldest second set from storage to advance the rolling window when the rolling window is full and a new corresponding second set is obtained for the current performing of said primary assessment; and
deleting the second vibration data and the corresponding automatic diagnosis from a prior primary assessment.

5. The method of claim 4, wherein said one wireless monitoring unit further comprises a near field communication interface, and further comprising:
linking with a near field communication enabled device in proximity to said one wireless monitoring unit; and
sending content of said rolling window from said storage to the near field communication enabled device through said near field communication interface.

6. The method of claim 1, further comprising:
periodically performing said primary assessment of said second set of indicators with said one wireless monitoring unit less often than said periodically performing of said preliminary assessment; and
for each one primary assessment of said periodically performing of said primary assessment, automatically sending from the wireless radio frequency communication module a third communication comprising results of said automatic diagnosis corresponding to said one primary assessment; and
wherein all automatic communication sent from the wireless radio frequency communication module responsive to performing said one primary assessment excludes said acquired second vibration data, and said derived second set of indicators.

7. The method of claim 1, wherein said second communication is sent off-site through the gateway, and further comprising:
receiving at an off-site processing system results of said automatic diagnosis for said each one wireless monitoring unit of said one machine, wherein said results of said automatic diagnosis for said each one wireless monitoring unit is a test point automatic diagnosis that corresponds to said location on said one machine at which said one wireless monitoring unit is installed; and
consolidating said results of each one of said test point automatic diagnosis to derive a machine-level automatic diagnosis.

8. The method of claim 1,
wherein at least one machine among said plurality of machines has a plurality of wireless monitoring units;
wherein a first wireless monitoring unit among the plurality of wireless monitoring units is a primary wireless monitoring unit;
wherein all other wireless monitoring units among the plurality of wireless monitoring units are respective secondary wireless monitoring units;
wherein for each one of said respective secondary wireless monitoring units, said second communication is sent over a wireless radio frequency network to said primary wireless monitoring unit; and
further comprising:
receiving at said primary wireless monitoring unit results of said automatic diagnosis for said each one secondary wireless monitoring unit of said one machine, wherein said results of said automatic diagnosis for said each one secondary wireless monitoring unit is a test point automatic diagnosis that corresponds to the location on said one machine at which said one secondary wireless monitoring unit is installed;
consolidating by said primary wireless monitoring unit said results of each one of said test point automatic diagnosis to derive a machine level automatic diagnosis; and
automatically sending a fourth communication comprising said machine level automatic diagnosis off-site through said gateway.

9. The method of claim 6,
wherein at least one machine among said plurality of machines has a plurality of wireless monitoring units;
wherein a first wireless monitoring unit among the plurality of wireless monitoring units is a primary wireless monitoring unit;
wherein all other wireless monitoring units among the plurality of wireless monitoring units are respective secondary wireless monitoring units;
wherein for each one of said respective secondary wireless monitoring units, said second communication is sent over a wireless radio frequency network to said primary wireless monitoring unit; and
further comprising:
receiving at said primary wireless monitoring unit results of said automatic diagnosis for said each one secondary wireless monitoring unit of said one machine, wherein said results of said automatic diagnosis for said each one secondary wireless monitoring unit is a test point automatic diagnosis that corresponds to the location on said one machine at which said one secondary wireless monitoring unit is installed;
consolidating by said primary wireless monitoring unit said results of each one of said test point automatic diagnosis to derive a machine level automatic diagnosis; and
automatically sending a fourth communication comprising said machine level automatic diagnosis off-site through said gateway.

10. A system for remotely monitoring a plurality of machines to provide automatic diagnoses to an off-site processing center, comprising:
   a plurality of wireless monitoring units mounted among the plurality of machines, so that each one machine among the plurality of machines has one or more of said plurality of wireless monitoring units mounted thereon; and
   a communication gateway, which together with the plurality of wireless monitoring units forms a wireless radio frequency network; and
   wherein each one wireless monitoring unit of the plurality of wireless monitoring units comprises a processor, storage, a vibration sensor, and a wireless radio frequency communication module;
   wherein the processor is configured to periodically perform a preliminary assessment of a first indicator set of diagnostic health of said one machine, said preliminary assessment comprising controlling said vibration sensor to acquire first vibration data, deriving said first set of indicators from the acquired first vibration data; storing said derived first indicator set in said storage, and analyzing said derived first indicator set for a threshold change relative to a derived first indicator set from a previous performing of said preliminary assessment to derive one of either a pass result or a fail result;
   wherein the processor is configured, when a current performing of said preliminary assessment has the pass result, in response automatically to control the wireless radio frequency communication module to send a first communication off-site through the gateway indicative of the pass result;
   wherein all automatic communication off-site responsive to said deriving a pass result excludes said derived first indicator set and the acquired first vibration data;
   wherein the processor is configured, when the current performing of said preliminary assessment has the fail result, in response automatically to control performing a primary assessment of a second set of indicators of diagnostic health of said one machine with said one wireless monitoring unit, said primary assessment comprising controlling said vibration sensor to acquire second vibration data; deriving said second set of indicators from the acquired second vibration data; storing said acquired second vibration data and said derived second set of indicators in said storage, and analyzing said derived second set of indicators to perform automatic diagnosis corresponding to a location of said one wireless monitoring unit;
   wherein the processor is configured, for each performing of said primary assessment responsive to said current performing of said preliminary assessment having said fail result, to command automatically the wireless radio frequency communication module to send a second communication comprising results of said automatic diagnosis and a diagnosis of the derived first indicator set that led to the fail result of the corresponding preliminary assessment; and
   wherein all automatic communication through the wireless radio frequency communication module responsive to said deriving the fail result excludes said acquired first vibration data, said acquired second vibration data, said derived first indicator set, and said derived second set of indicators.

11. The system of claim 10, wherein said first indicator set consists of overall velocity.

12. The system of claim 11, wherein said second set of indicators comprises at least four indicators from the group of indicators consisting of: overall acceleration; overall velocity; a value of a high frequency acceleration energy band; a value of a low frequency acceleration energy band; a value of a medium frequency acceleration energy band; an indicator of bearing health grade; a binary indicator of shock presence; an amplitude of a first harmonic of rotation speed extracted on a velocity spectrum; an amplitude of a second harmonic of the rotation speed extracted on the velocity spectrum; an amplitude of a third harmonic of the rotation speed extracted on the velocity spectrum; an amplitude of a first harmonic of the rotation speed extracted on an acceleration spectrum; an amplitude of a second harmonic of the rotation speed extracted on an acceleration spectrum; an amplitude of a third harmonic of the rotation speed extracted on an acceleration spectrum; and kurtosis.

13. The system of claim 10, wherein the processor is further configured for:
   periodically performing said primary assessment of said second set of indicators with said one wireless monitoring unit less often than said periodically performing of said preliminary assessment; and
   for each one primary assessment of said periodically performing of said primary assessment, automatically sending from the wireless radio frequency communication module a third communication comprising results of said automatic diagnosis corresponding to said one primary assessment; and
   wherein all automatic communication sent from the wireless radio frequency communication module responsive to performing said one primary assessment excludes said acquired second vibration data, and said derived second set of indicators.

14. The system of claim 13,
   wherein a first machine among said plurality of machines has a plurality of wireless monitoring units;
   wherein a first wireless monitoring unit among the plurality of wireless monitoring units of the first machine is a primary wireless monitoring unit;
   wherein all other wireless monitoring units among the plurality of wireless monitoring units of the first machine are respective secondary wireless monitoring units;
   wherein for each one of said respective secondary wireless monitoring units, said second communication is sent over a wireless radio frequency network to said primary wireless monitoring unit; and
   wherein the processor of said primary wireless monitoring unit is further configured
   to consolidate results of said automatic diagnosis derived by said each one secondary wireless monitoring unit of said one machine, which results are received at said primary wireless monitoring unit, to derive a machine level automatic diagnosis; and
   to automatically command the wireless radio frequency communication module to send a fourth communication comprising said machine level automatic diagnosis off-site through said gateway.

15. The system of claim 10,
   wherein a first machine among said plurality of machines has a plurality of wireless monitoring units;
   wherein a first wireless monitoring unit among the plurality of wireless monitoring units of the first machine is a primary wireless monitoring unit;

wherein all other wireless monitoring units among the plurality of wireless monitoring units of the first machine are respective secondary wireless monitoring units;

wherein for each one of said respective secondary wireless monitoring units, said second communication is sent over a wireless radio frequency network to said primary wireless monitoring unit; and wherein the processor of said primary wireless monitoring unit is further configured to consolidate results of said automatic diagnosis derived by said each one secondary wireless monitoring unit of said one machine, which results are received at said primary wireless monitoring unit, to derive a machine level automatic diagnosis; and to automatically command the wireless radio frequency communication module to send a fourth communication comprising said machine level automatic diagnosis off-site through said gateway.

16. A wireless monitoring unit for monitoring diagnostic performance of a host machine on which the wireless monitoring unit is mounted to derive and send an automatic diagnosis over a wireless radio frequency network, the wireless monitoring unit comprising:

a vibration sensor that senses vibration of the host machine;

a processor configured to analyze indicators of diagnostic health of the host machine based on vibration data acquired by the vibration sensor and to derive said automatic diagnosis;

storage means for storing said vibration data, said indicators, and said automatic diagnosis; and a wireless radio frequency communication module adapted to wirelessly communicate over said wireless radio frequency network; and wherein the processor is configured to periodically perform a preliminary assessment of a first indicator set of diagnostic health of said host machine, said preliminary assessment comprising controlling the vibration sensor to acquire first vibration data with said vibration sensor, deriving said first set of indicators from the acquired first vibration data; storing said derived first indicator set in said storage, and analyzing said derived first indicator set for a threshold change relative to a derived first indicator set from a previous performing of said preliminary assessment to derive one of either a pass result or a fail result;

wherein the processor is configured, in response to a current performing of said preliminary assessment having the pass result, to control the wireless radio frequency communication module to send a first communication over the wireless radio frequency network indicative of the pass result;

wherein the processor is configured so that all communication responsive to said deriving a pass result excludes said derived first indicator set and the acquired first vibration data;

wherein the processor is configured, in response the current performing of said preliminary assessment having the fail result, to control performing a primary assessment of a second set of indicators of diagnostic health of said one machine, said primary assessment comprising controlling the vibration sensor to acquire second vibration data with said vibration sensor; deriving said second set of indicators from the acquired second vibration data; storing said acquired second vibration data and said derived second set of indicators in said storage, and analyzing said derived second set of indicators to perform automatic diagnosis corresponding to a location at which said one wireless monitoring unit is mounted;

wherein for each performing of said primary assessment responsive to said current performing of said preliminary assessment having said fail result, the processor is configured to automatically command the wireless radio frequency communication module to send a second communication comprising results of said automatic diagnosis and a diagnosis of the derived first indicator set that led to the fail result of the corresponding preliminary assessment; and wherein the processor is configured so that all automatic communication through the wireless radio frequency communication module responsive to said deriving the fail result excludes said acquired first vibration data, said acquired second vibration data, said derived first indicator set, and said derived second set of indicators.

17. The wireless monitoring unit of claim 16, wherein said first indicator set consists of overall velocity.

18. The wireless monitoring unit of claim 16, wherein said second set of indicators comprises at least four indicators from the group of indicators consisting of: overall acceleration; overall velocity; a value of a high frequency acceleration energy band; a value of a low frequency acceleration energy band; a value of a medium frequency acceleration energy band; an indicator of bearing health grade; a binary indicator of shock presence; an amplitude of a first harmonic of rotation speed extracted on a velocity spectrum; an amplitude of a second harmonic of the rotation speed extracted on the velocity spectrum; an amplitude of a third harmonic of the rotation speed extracted on the velocity spectrum; an amplitude of a first harmonic of the rotation speed extracted on an acceleration spectrum; an amplitude of a second harmonic of the rotation speed extracted on an acceleration spectrum; an amplitude of a third harmonic of the rotation speed extracted on an acceleration spectrum; and kurtosis.

19. The wireless monitoring unit of claim 16, wherein for each performing of said primary assessment the corresponding acquired second vibration data, the derived second set of indicators, and the automatic diagnosis together are a corresponding data set; and wherein the processor is further configured to maintain said corresponding data set in storage for each of 'n' most recently performed primary assessments as a rolling window of data sets; and erase an oldest data set from storage to advance the rolling window when the rolling window is full and a new corresponding data set is obtained for the current performing of said primary assessment.

20. The wireless monitoring unit of claim 16, wherein the processor is further configured for:

periodically performing said primary assessment of said second set of indicators with said one wireless monitoring unit less often than said periodically performing of said preliminary assessment; and for each one primary assessment of said periodically performing of said primary assessment, automatically sending from the wireless radio frequency communication module a third communication comprising results of said automatic diagnosis corresponding to said one primary assessment; and wherein all automatic communication sent from the wireless radio frequency communication module responsive to performing said one primary assessment excludes said acquired second vibration data, and said derived second set of indicators.

\* \* \* \* \*